US008560636B2

(12) United States Patent  (10) Patent No.: US 8,560,636 B2
Kieselbach  (45) Date of Patent: Oct. 15, 2013

(54) METHODS AND SYSTEMS FOR PROVIDING A VIRTUAL NETWORK PROCESS CONTEXT FOR NETWORK PARTICIPANT PROCESSES IN A NETWORKED BUSINESS PROCESS

(75) Inventor: Oliver Kieselbach, Bielefeld (DE)

(73) Assignee: SAP AG, Walldorf (DE)

( * ) Notice: Subject to any disclaimer, the term of this patent is extended or adjusted under 35 U.S.C. 154(b) by 421 days.

(21) Appl. No.: 12/873,078

(22) Filed: Aug. 31, 2010

(65) Prior Publication Data

US 2012/0054301 A1  Mar. 1, 2012

(51) Int. Cl.
  G06F 15/16  (2006.01)
  G06F 15/173  (2006.01)
(52) U.S. Cl.
  USPC ............................ 709/218; 709/204; 709/224
(58) Field of Classification Search
  USPC .................................. 709/201–207, 217–232
  See application file for complete search history.

(56) References Cited

U.S. PATENT DOCUMENTS

| | | | |
|---|---|---|---|
| 7,461,346 B2 | 12/2008 | Fildebrandt | |
| 7,584,457 B2 | 9/2009 | Hammerich et al. | |
| 7,590,614 B2 | 9/2009 | Fildebrandt et al. | |
| 7,793,301 B2* | 9/2010 | Bhat et al. ..................... | 719/313 |
| 2002/0091702 A1 | 7/2002 | Mullins | |
| 2002/0111922 A1 | 8/2002 | Young et al. | |
| 2003/0061006 A1 | 3/2003 | Richards et al. | |
| 2003/0236691 A1* | 12/2003 | Casatl et al. ...................... | 705/8 |
| 2005/0027811 A1* | 2/2005 | Kraft ............................. | 709/207 |
| 2005/0165859 A1 | 7/2005 | Geyer et al. | |
| 2005/0256946 A1 | 11/2005 | Childress et al. | |
| 2005/0262493 A1 | 11/2005 | Schmidt et al. | |
| 2005/0283478 A1 | 12/2005 | Choi et al. | |
| 2006/0085245 A1 | 4/2006 | Takatsuka et al. | |
| 2006/0235742 A1 | 10/2006 | Castellanos et al. | |
| 2006/0259633 A1 | 11/2006 | Spearman et al. | |
| 2007/0179971 A1 | 8/2007 | Benson | |
| 2007/0198506 A1 | 8/2007 | Attaran Rezaei et al. | |
| 2007/0255715 A1* | 11/2007 | Li et al. ........................... | 707/10 |
| 2007/0266095 A1* | 11/2007 | Billsus et al. .................. | 709/204 |

(Continued)

FOREIGN PATENT DOCUMENTS

WO  WO2005/096138  10/2005
WO  WO2008/042771  4/2008

OTHER PUBLICATIONS

U.S. Appl. No. 12/836,123, filed Jul. 14, 2010 entitled "*Context for Sharing Data Objects*", 35 pages.

(Continued)

*Primary Examiner* — Yasin Barqadle
(74) *Attorney, Agent, or Firm* — Fish & Richardson P.C.

(57) ABSTRACT

The present disclosure involves systems, software, and computer implemented methods for providing a virtual process context to a plurality of network participants associated with a networked business process. One example method comprises associating a networked business process with a virtual process context, the networked business process comprising a set of interrelated business processes performed by at least two different network participants, receiving a first data object from a first network participant business process associated with the networked business process, storing the received first data object in the virtual process context associated with the networked business process, and notifying at least a second network participant of the stored first data object. In some instances, notifying at least a second network participant of the stored first data object may include transmitting a copy of the first data object to at least a second network participant associated with the first data object.

20 Claims, 11 Drawing Sheets

(56) References Cited

U.S. PATENT DOCUMENTS

| | | |
|---|---|---|
| 2008/0059387 A1 | 3/2008 | Vaidhyanathan et al. |
| 2008/0162551 A1 | 7/2008 | Geyer et al. |
| 2008/0183513 A1* | 7/2008 | Keedwell ................... 705/7 |
| 2008/0229422 A1 | 9/2008 | Hudis et al. |
| 2009/0112655 A1* | 4/2009 | Stuhec et al. ................ 705/7 |
| 2009/0125595 A1 | 5/2009 | Maes |
| 2009/0187453 A1* | 7/2009 | Dill et al. ................... 705/9 |
| 2009/0199274 A1 | 8/2009 | Frazier et al. |
| 2010/0082380 A1 | 4/2010 | Merrifield et al. |
| 2010/0114960 A1 | 5/2010 | Fusari et al. |
| 2010/0251264 A1* | 9/2010 | McGuire et al. ............ 719/317 |
| 2011/0072365 A1 | 3/2011 | Pall et al. |
| 2011/0191745 A1 | 8/2011 | Allam et al. |
| 2011/0239227 A1 | 9/2011 | Schaefer et al. |
| 2011/0258430 A1 | 10/2011 | Luukkala et al. |
| 2012/0110020 A1 | 5/2012 | Weissman et al. |

OTHER PUBLICATIONS

U.S. Appl. No. 12/868,326, filed Aug. 25, 2010 entitled "*Task Importance Indicator Based on Personalized Rules*", 33 pages.
*Business Process Model and Notation* (*BPMN*) Ver. 2.0; dated May 2010; OMG Document No. dtc/May 3, 2010; (http://www.omgwiki.org/bpmn2.0-ftf/lib/exe/fetch.php?id=public%3Ahome&cache=cache&media=public:bpmn_2-0_dtc-2010-05-03_-_no_markup.pdf) [retrieved from the Internet Aug. 31, 2010].
*Cloud Computing*, Wikipedia article, dated Aug. 31, 2010, 25 pages (http://en.wikipedia.org/wiki/Cloud_computing) [retrieved from the Internet Aug. 31, 2010].
*Business Process Modeling*, Wikipedia Article, dated Aug. 31, 2010, 13 pages; (http://en.wikipedia.org/wiki/Business_process_modeling) [retrieved from the Internet Aug. 31, 2010].
*Business Process Modeling Notation*, Wikipedia article, dated Aug. 31, 2010, 10 pages; (http://en.wikipedia.org/wiki/Business_Process_Modeling_Notation) [retrieved from the Internet Aug. 31, 2010].
Amazon web services, "Amazon Simple Storage Service (Amazon S3)" http://aws.amazon.com/s3/, 8 pages.
Office Action issued in U.S. Appl. No. 12/836,123 on Dec. 28, 2012; 11 pages.
Office Action issued in U.S. Appl. No. 12/873,055 on Dec. 12, 2012; 16 pages.
Office Action issued in U.S. Appl. No. 12/873,055 on Jun. 19, 2012; 14 pages.
Office Action issued in U.S. Appl. No. 12/873,050 on Mar. 2, 2012; 13 pages.
Office Action issued in U.S. Appl. No. 12/873,050 on Aug. 30, 2012; 13 pages.
Extended European Search Report issued in European Application No. 11006439.1 on Oct. 21, 2011; 8 pages.
Notice of Allowance issued in U.S. Appl. No. 12/873,050 on Mar. 14, 2013, 8 pages.

\* cited by examiner

METHODS AND SYSTEMS FOR PROVIDING A VIRTUAL NETWORK PROCESS CONTEXT FOR NETWORK PARTICIPANT PROCESSES IN A NETWORKED BUSINESS PROCESS

TECHNICAL FIELD

The present disclosure relates to software, computer systems, and computer implemented methods for providing transparency to networked business processes.

BACKGROUND

In recent years, companies have begun performing operations and transactions across company boundaries, conducting business with external entities such as business partners, distribution centers, outsourcing companies, compliance auditors, banks, logistics providers, and others. For example, many business models have evolved from single enterprise business models into inter-connected and networked business models. As business models have begun to incorporate multiple entities, communication and interactions within the networked business model remains difficult, with each participant operating as a "black box," receiving an input and returning an output for further use in the networked business process.

Business process modeling notation (BPMN) is a standard for business process modeling, and provides a graphical notification for specifying business processes in a Business Process Diagram (BPD), based on a flowcharting technique similar to activity diagrams from Unified Modeling Language (UML). In general, the objective of BPMN is to support business process management for both technical users and business users by providing a notation that is intuitive to business users, yet capable of representing complex process semantics. Further, the BPMN specification can provide a mapping between the graphics of the notation to the underlying constructs of execution languages, including Business Process Execution Language. Because BPMN is understandable by both technical and business users, networked business processes can be described using BPMN, providing a common point of understanding for users from different entities.

SUMMARY

The present disclosure involves systems, software, and computer implemented methods for providing a virtual process context to a plurality of network participants associated with a networked business process. One example method comprises associating a networked business process with a virtual process context, the networked business process comprising a set of interrelated business processes performed by at least two different network participants, receiving a first data object from a first network participant business process associated with the networked business process, storing the received first data object in the virtual process context associated with the networked business process, and notifying at least a second network participant of the stored first data object. In some instances, notifying at least a second network participant of the stored first data object may include transmitting a copy of the first data object to at least a second network participant associated with the first data object.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
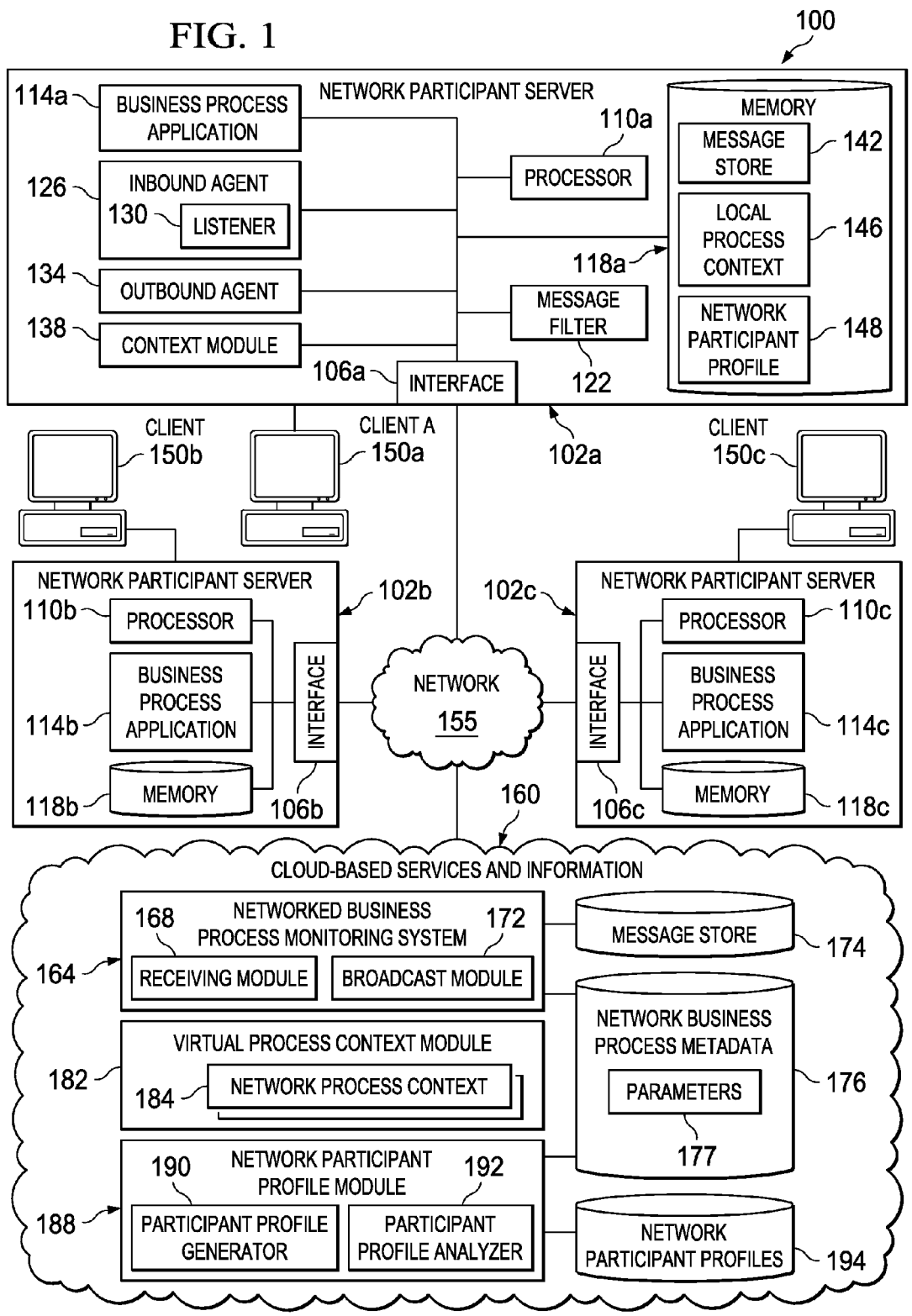
FIG. 1 illustrates an example environment for implementing various features of a networked business process providing increased transparency among its participants.

This disclosure generally describes computer systems, software, and computer implemented methods for providing increased transparency in networked business processes and between networked business process participants. The present disclosure provides tools and processes for allowing network participants to easily, quickly, and efficiently communicate status updates, events, and other process-related information to one another as processes local to the network participants are performed and completed. In current systems, network participants are often unable to understand, view, or receive information on processes being performed by other network participants. For example, network participants may not know which other participants handle a particular request, how long the particular request may take to be processed, the current status of the particular request and its associated events, as well as other information of interest. In general, processes performed by other network participants are viewed as "black box" type events once requests, signals, or messages leave the requesting network participant. Because of the various unknown factors common to inter-entity processes, customers, service providers, and other potential participants are reluctant to integrate their new and existing processes into a networked business process. Without increased transparency, the adoption of networked business processes will remain stagnant.

The present disclosure provides several methods of increased transparency associated with networked business processes. First, the present disclosure describes a system and method for monitoring business interactions between network participants and their corresponding business processes that are involved in a networked business process. In general, business interactions are monitored by a centralized monitoring system in a cloud-based network, where the monitoring system receives signals and/or messages from the various network participants in response to particular events within those network participants' local business processes. Once the signals and/or messages are received, the centralized monitoring system determines one or more of the other network participants with business processes or operations related to the received signals and/or messages. The determined one or more of the other network participants are notified of the received signals and/or messages, providing the one or more other network participants with information and data associated with the business process being executed. In some instances, the received signals and/or messages can be used to determine or analyze the status of a particular process within an overall networked business process in order to calculate one or more metrics associated with a particular network participant or process. The centralized monitoring system can act as a router, relay, and manager of status information between network participants, thereby providing increased transparency and confidence in networked business processes. In some instances, the monitoring system can assist network participants in calculating the effectiveness, timeliness, and general capabilities of other network participants, as well as in determining whether a particular business process within an overall networked business process is being performed satisfactorily.

The second tool for increased transparency in networked business processes described in the present disclosure is a virtual network process context shared across two or more network participants during the execution of the networked business process. In general, integration between systems and processes occurs based on defined interfaces describing the expected input data and the expected result data associated with two systems. As networked business processes expand beyond two integrated systems and/or processes, however, these interfaces decrease the transparency of networked business processes by limiting the sharing of information between the two integrated systems. BPM process runtimes, however, have the ability to carry, at runtime, a process context during the lifetime of the process instance. The process context stores information collected during the execution of the process steps, including both predefined, structured data (e.g., eXtensible Markup Language ("XML")-based documents) and unstructured data (e.g., PDF documents).

The virtual network process context described herein provides a general repository in which data associated with the networked business process can be stored and/or accessed by multiple network participants. The virtual network process context provides a delocalized store of networked business process information that can be updated and modified during the execution of the networked business process in order to maintain the most current process information across network participants. In other words, the virtual network process context allows network process participants to seamlessly share information during the execution of the networked business process, providing an efficient system for storing and sharing data relevant to the networked business process. In some instances, the data stored in the virtual process context can replace traditional business-to-business ("B2B") or application-to-application ("A2A") messages currently sent to maintain consistency and data between network participants, allowing information to be immediately accessible to and shared by all network participants.

The third tool for increased transparency described in the present disclosure is a system for analyzing the quality of services provided by a current, proposed, or potential network participant. As networked business processes are originally defined or updated, information regarding the various network participants and their corresponding business processes is of assistance in determining the quality of interactivity, transparency, and compatibility that can be provided by an individual network participant or business process. Using metadata and other information associated with current and potential network participants, a centralized tool for determining and managing the quality of services available from certain network participants or processes allows for knowledgeable decisions to be made prior to including a particular entity or process in a networked business process, as well as for replacing current participants or processes included in the networked business process with one or more replacement entities or processes. In some instances, the quality of services may define the level of transparency available from a particular entity or business process, as well as the type of information that a particular entity or business process can provide to the other network participants associated with the networked business process.

FIG. 1 illustrates an example environment 100 implementing various features of a networked business process providing increased transparency among its participants, including a centralized networked business process interaction monitor, a virtual process context module, and a network participant profile tool for generating and analyzing profiles associated with current and potential network participants. The illustrated environment includes, or is communicably coupled with, a plurality of network participant servers 102 (each associated with at least one corresponding client 150), and a set of cloud-based services and information 160, where the set of cloud-based services and information 160 includes a plurality of on-demand services, systems, and modules associated with a networked business process involving two or more of the network participant servers 102. At least some of the network participant servers 102 and the set of cloud-based services and information 160 may communicate across or via network 155. In general, environment 100 depicts an example configuration of a system capable of providing increased transparency to a networked business process and between a set of network participants. In alternative implementations, the elements illustrated within the network participant servers 102 and/or the set of cloud-based services and information 160 may be included in or associated with different and/or additional servers, clients, networks, or locations, as opposed to those illustrated in FIG. 1. For example, the components illustrated in the set of cloud-based services and information 160 may be included in multiple cloud-based networks or locations accessible to the network participant servers 102.

In general, the network participant servers (102a, 102b, and 102c) are any servers that store and execute business processes via one or more business process applications 114, where the business process applications 114 are associated with at least one networked business process performed across a plurality of the network participant servers 102. For example, each server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, each server 102 may store a plurality of various other applications, while in other instances, each server 102 may be a dedicated server meant to store and execute a particular business process application 114 and its related functionality. In some instances, any of the servers 102 may comprise a web server or be communicably coupled with a web server, where the particular business process application 114 for that server 102 represents a web-based application accessed and executed by the associated clients 150 to perform the programmed tasks or operations of the corresponding business process application 114.

At a high level, each server 102 comprises an electronic computing device operable to receive, transmit, process, store, or manage data and information associated with the environment 100. Each server 102 illustrated in FIG. 1 can be responsible for receiving application requests from one or more clients 150 or business process applications 114 associated with one or more of the other network participant servers 102 included in a networked business process, responding to the received requests by processing said requests in the associated business process application 114, and sending the appropriate responses from the business process application 114 back to the requesting client 150, business process application 114, or centralized networked business process monitoring system 164 (illustrated in the set of cloud-based services and information 160). The business process application 114 can also process and respond to local requests from a user locally accessing the associated server 102. Accordingly, in addition to requests from the external clients 150 illustrated in FIG. 1, requests associated with a particular business process application 114 may also be sent from internal users, external or third-party customers, and other automated business process applications 114, as well as any other appropriate entities, individuals, systems, or computers. In some instances, each business process application 114 may be a web-based application executing functionality associated with the overall networked business process.

As used in the present disclosure, the term "computer" is intended to encompass any suitable processing device. For example, although FIG. 1 illustrates three network participant servers 102, environment 100 can be implemented using any number of servers 102, as well as computers other than servers, including a server pool. Indeed, each server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated servers 102 may be adapted to execute any operating system, including Linux, UNIX, Windows, Mac OS, or any other suitable operating system. According to one implementation, one or more of the servers 102 may also include or be communicably coupled with a mail server.

In the illustrated implementation, and as shown in FIG. 1, each network participant server 102 includes an interface 106, a processor 110, a memory 118, and a business process application 114. The interface 106 is used by each server 102 to communicate with other systems in a client-server or other distributed environment (including within environment 100) connected to the network 155 (e.g., an associated client 150 or the set of cloud-based services and information 160, as well as other systems communicably coupled to the network 155). FIG. 1 depicts both a server-client environment, as well as a cloud computing network. Various other implementations of the illustrated environment 100 can be provided to allow for increased transparency in networked business processes, including by allowing access to one or more of the business process applications 114 through a node or location within a cloud computing network. In some instances, the business process applications (114a, 114b, and 114c) may communicate with each other (including via the networked business process monitoring system 164), providing instructions and other information or data initiating or associated with one or more of the other business process applications 114. Generally, each interface 106 comprises logic encoded in software and/or hardware in a suitable combination and operable to communicate with the network 155. More specifically, each interface 106 may comprise software supporting one or more communication protocols associated with communications such that the network 155 or interface's hardware is operable to communicate physical signals within and outside of the illustrated environment 100.

Generally, each network participant server 102 may be communicably coupled with a network 155 that facilitates wireless or wireline communications between the components of the environment 100 (i.e., between the network participant servers 102, their respective clients 150, and/or between the network participant servers 102 and the set of cloud-based services and information 160), as well as with any other local or remote computer, such as additional clients, servers, or other devices communicably coupled to network 155, including those not illustrated in FIG. 1. In the illustrated environment, the network 155 is depicted as a single network in FIG. 1, but may be comprised of more than one network without departing from the scope of this disclosure, so long as at least a portion of the network 155 may facilitate communications between senders and recipients. In some instances, the network 155 may include all or a portion of the set of cloud-based services and information 160. The network 155 may be all or a portion of an enterprise or secured network, while in another instance, at least a portion of the network 155 may represent a connection to the Internet. In some instances, a portion of the network 155 may be a virtual private network (VPN), such as, for example, the connection between at least one of the network participant servers 102 and the centralized networked business process monitoring system 164. Further, all or a portion of the network 155 can comprise either a wireline or wireless link. Example wireless links may include 802.11a/b/g/n, 802.20, WiMax, and/or any other appropriate wireless link. In other words, the network 155 encompasses any internal or external network, networks, sub-network, or combination thereof operable to facilitate communications between various computing components inside and outside the illustrated environment 100. The network 155 may communicate, for example, Internet Protocol (IP) packets, Frame Relay frames, Asynchronous Transfer Mode (ATM) cells, voice, video, data, and other suitable information between network addresses. The network 155 may also include one or more local area networks (LANs), radio access networks (RANs), metropolitan area networks (MANs), wide area networks (WANs), all or a portion of the Internet, and/or any other communication system or systems at one or more locations. The network 155, however, is not a required component in all implementations of the present disclosure.

As illustrated in FIG. 1, each of the network participant servers 102a, 102b, and 102c includes a processor 110. Although illustrated as a single processor 110 in each of the network participant servers 102 in FIG. 1, two or more processors may be used in one or more of the illustrated servers 102 according to particular needs, desires, or particular embodiments of environment 100. Each processor 110 may be a central processing unit (CPU), a blade, an application specific integrated circuit (ASIC), a field-programmable gate array (FPGA), or another suitable component. Generally, the processor 110 executes instructions and manipulates data to perform the operations of corresponding network participant server 102 and, specifically, the functionality associated with the corresponding business process application 114. In one implementation, the server's processor 110 executes the functionality required to receive and respond to requests and instructions from the corresponding client 150, as well as the functionality required to perform the other operations of the associated business process application 114.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 110 executes the corresponding business process application 114 stored on the associated server 102. In some instances, a particular network participant server 102 may be associated with two or more business process applications 114.

At a high level, each business process application 114 is any application, program, module, process, or other software that may execute, change, delete, generate, or otherwise manage information associated with a particular network participant server 102, and in some cases, a networked business process combining interactions between two or more business process applications 114. In some instances, a particular business process application 114 may operate in response to and in connection with one or more requests received from an associated client 150. Additionally, a particular business process application 114 may operate in response to and in connection with one or more requests received from other business process applications 114, including a business process application associated with another network participant server 102. In some instances, information associated with a request may be relayed by or provided via the centralized networked business process monitoring system 164, allowing requests, updates, and other information to be directed to a single location and providing the ability to easily expand a networked business process. Additionally, each business process application 114 may represent a web-based application accessed and executed by remote clients 150 via the network 155 (e.g., through the Internet, or via the set of cloud-based services and information 160). Further, while illustrated as internal to a particular network participant server 102, one or more processes associated with a particular business process application 114 may be stored, referenced, or executed remotely. For example, a portion of a particular business process application 114 may be a web service associated with the business process application 114 that is remotely called, while another portion of the business process application 114 may be an interface object or agent bundled for processing at a remote client 150. Moreover, any or all of a particular business process application 114 may be a child or sub-module of another software module or enterprise application (not illustrated) without departing from the scope of this disclosure. Still further, portions of the particular business process application 114 may be executed or accessed by a user working directly at the corresponding network participant server 102, as well as remotely at a corresponding client 150.

Two or more business process applications 114 can be combined to create and perform a networked business process. A networked business process is an end-to-end business process performing operations across two or more network participants that perform different portions of an overall business process. In many instances, a networked business process is performed across inter-company borders and environments, and can incorporate functionality provided independently from various different network participants. In some instances, intermediate and end-of-process outputs and signals provided by one business process application 114 may be used or considered when performing actions within another business process application 114 in the same networked business process.

Figure 2:
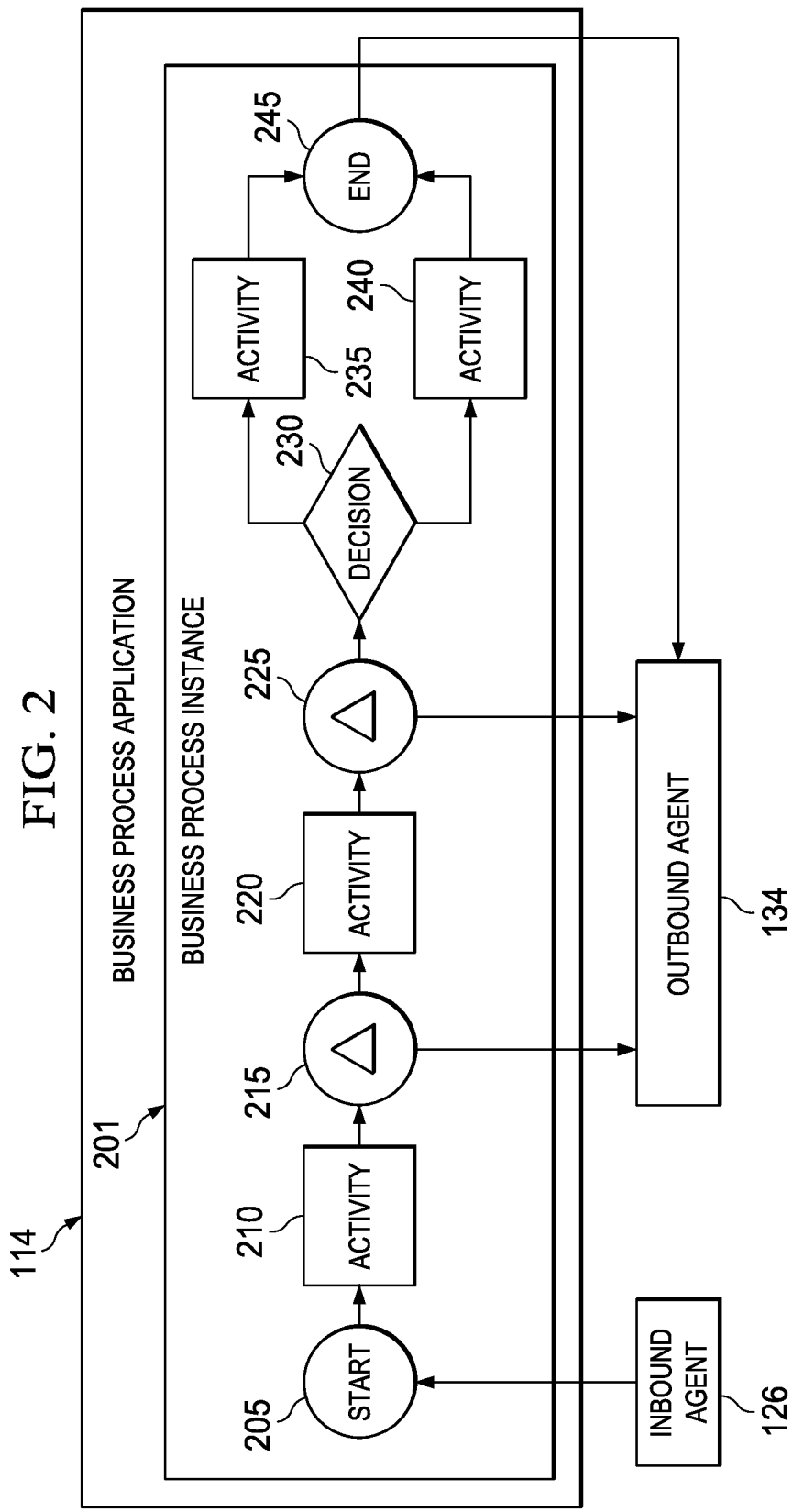
FIG. 2 is an example of a business process illustrated in Business Process Modeling Notation (BPMN) included as part of a networked business process in a suitable system, such as the system described in FIG. 1.

While the business process applications 114 can be represented in any suitable notation, many business process applications 114 can be represented in Business Process Modeling Notation (BPMN) as illustrated in FIG. 2. BPMN (current version 2.0) provides well-known graphical notations for events, activities, and decisions performed within a particular overall process. BPMN is not necessarily tied to a particular underlying programming language, and may be used with any suitable programming language including JAVA, ABAP, or C++, among others.

FIG. 2 specifically illustrates an example business process application 114 that includes a business process instance 201. The business process instance 201 includes a business process model represented by various graphical elements that are part of the BPMN standard. A start event 205 associated with the illustrated business process instance 201 is triggered to begin the business process instance 201. As illustrated, an inbound agent 126 (also illustrated within network participant server 102 of FIG. 1) may interpret information received from an internal or external source (including another business process application 114, a user associated with the network participant server 102, or the centralized networked business process monitoring system 164) to trigger the start event 205 and initialize the business process instance 201.

After the start event 205 is triggered, a first activity 210 is performed. An activity in BPMN, such as the first activity 210, represents specific work or processes to be performed within the modeled business process or instance. Next, the data associated with or results of the first activity 210 are provided to an intermediate event 215. Intermediate events represent an event that occurs between the start and end event, and can provide an opportunity for a business process to send information outside of the business process prior to the corresponding end event. For example, and as illustrated in FIG. 2, the intermediate event 215 may be associated with a particular signal or message that is provided to an outbound agent 134, where the outbound agent 134 directs the outgoing signal or message to the appropriate location. Within environment 100, the outbound agent 134 may process the signal or message provided by the intermediate event 215 and send that information to the centralized networked business process monitoring system 164 for further processing. In other instances, the outbound agent 134 may send the signal or message directly to another participant within the illustrated environment, such as the business process application 114b of network participant server 102b.

Upon performing the operations of the intermediate event 215, the business process instance 201 continues at the second activity 220, where additional processing or operations are performed. Business process instance 201 includes a second intermediate event 225 after the second activity 220, where, again, information associated with the current status and state of the business process instance 201 is provided to the outbound agent 134. In some instances, the signal or message sent by the intermediate event 225 can be sent to the same location as the prior intermediate event 215 (e.g., the centralized networked business process monitoring system 164 or another business process application 114 within environment 100) or a different location or recipient. In some instances, the signal or message can be sent to the same location, but relayed to a different recipient.

After the second intermediate event 225, a decision step 230 is provided. The decision step 230 may also be called a gateway, and can be used to determine, based on the data flow within the associated business process instance 201, how to fork, split, or otherwise direct the control flow of the business process instance 201. In some instances, gateways may be used to merge separate flows in a business process instance 201, such as when concurrently performed operations are combined to perform another activity. Based on the conditions received at the decision step 230, the business process instance 201 continues at either the third activity 235 or the fourth activity 240. Once the operations associated with the correct activity are performed, the business process instance 201 completes the business process at end event 245. The end event 245 represents the result of a process, and similar to an intermediate event, can return the results of the process. In the current example, the end event 245 presents the results of the process to the outbound agent 134, which can then forward those results to any suitable location or recipient. In some instances, multiple outbound agents may be used in place of the single illustrated outbound agent 134.

Returning to FIG. 1, additional modules including the inbound agent 126, the outbound agent 134, a message filter 122, and a context module 138 are illustrated within the network participant server 102a. All, some, or none of the modules may be included within the other network participant servers 102b and 102c. Additionally, some or all of the modules may be combined, as well as integrated into the functionality provided by another component. As described in FIG. 2, the inbound agent 126 forwards messages and information received via the interface 106a to the appropriate location within a business process application 114a or any other locations within the network participant server 102a. In some instances, the inbound agent 126 may direct messages to a particular activity or element of a business process application 114a, as well as to a particular business process application 114 in implementations where the network participant server 102a is associated with two or more business process applications 114. The inbound agent 126 can forward messages sent from the centralized networked business process monitoring system 164 to the network participant server 102a. In some implementations, however, the inbound agent 126 may also include a listener module 130, which may be associated with the centralized networked business process monitoring system 164. The listener module 130 can poll or otherwise determine from the centralized networked business process monitoring system 164 when new messages or signals are available, received, and/or generated. If a new message or signal is detected by the listener module 130, and if the new message or signal available at the centralized networked business process monitoring system 164 is associated with a business process application 114a at the inbound agent's 126 respective network participant server 102a, the inbound agent 126 may request or retrieve a copy of the message or signal from the networked business process monitoring system 164. Where messages and other information are sent directly to the network participant server 102a, the message filter module 122 may perform initial processing and analysis associated with the incoming message or information to determine its relevance and appropriate destination within the network participant server 102a. For example, if the received message is relevant to or associated with a particular business process application 114a, the message filter module 122 may provide the received message to the inbound agent 126 corresponding to the business process application 114a. Alternatively, the message filter module 122 may be a part of or interchangeable with at least a portion of the inbound agent 126. For example, the message filter module 122 may identify the appropriate location of a message or information from the centralized networked business process monitoring system 164, and forward that information directly to the appropriate business process application 114a or portion thereof.

The outbound agent 134 may be used to send signals, messages, and other information associated with the business process application 114a to the networked business process monitoring system 164. Events and actions in the business process application 114a associated with output or other intermediate events may provide associated data, messages, and information to the outbound agent 134, where the outbound agent 134 determines the location to which the information is to be sent. In some instances, output from a business process application 114a may be first provided to the message filter module 122, which may determine which sets of information or messages are to be sent outside of the network participant server 102a. In some instances, only a portion of the messages and information generated by a particular business process application 114a may be shared outside the network participant server 102a, with the message filter module 122 determining whether a particular message or other information is provided to the outbound agent 134. In some instances, the message filter module 122 may be a part of or may replace the functionality of the outbound agent 134, such that the message filter module 122 determines which information is to be shared outside the network participant server 102a, and subsequently sends that information to the appropriate locations itself.

The network participant server 102a is also illustrated as including a context module 138. Although not illustrated as such, the other network participant servers 102b and 102c may also include context modules. The context module 138 may be executed by the processor 110a, and can provide services associated with the business process application 114a. The context module 138 can provide interfaces, modules, services, or metadata definitions that enable the business process application 114a to provide accessibility to data objects stored in a local process context 146 within memory 118a. The context module 138 can also include functionality to provide context information associated with the business process application 114a with a centralized and networked virtual process context module 182 within the set of cloud-based services and information 160. For example, when actions associated with the local business process application 114*a* modify the data associated with a local or network process context, the context module 138 can send the updated information to the virtual process context module 182 for inclusion in and modification of the network process context 184.

The context module 138 performs operations for storing and accessing process context information associated with a particular local business process application 114*a*, as well as by receiving and/or retrieving process context information from a virtual process context module 182 associated with a networked business process performed across a plurality of network participant servers 102 and utilizing a plurality of interrelated business process applications (e.g., 114*a*, 114*b*, and 114*c*). In some instances, the context module 138 may monitor the virtual process context module 182 for new or modified context information associated with the networked business process. If new or modified context information is identified, the context module 138 can request or retrieve the updated context information and store that information locally within the local process context 146. Additionally, the context module 138 may receive notifications of context updates from the virtual process context module 182, and, in response thereto, may retrieve the associated context updates and modification to ensure that the local process context 146 is up-to-date with the network process context 184. In some instances, the context module 138 may be a service, process, or module solely for interacting with a network process context 184 stored in the set of cloud-based services and information 160. Instead of storing the information locally, the context module 138 may access the network process context 184 directly, such as through a web service call, to retrieve and access the network process context 184 associated with the networked business process. In those instances, a local process context 146 may be maintained at the network participant server 102*a*. The local process context 146 may be used for backup purposes, or for where no modifications to the network process context 184 have been identified such that the local process context 146 represents the current version of the network process context 184.

In general, each network participant server 102 also includes a memory 118 for storing data and program instructions. Each memory 118 may include any memory or database module and may take the form of volatile or non-volatile memory including, without limitation, magnetic media, optical media, random access memory (RAM), read-only memory (ROM), removable media, or any other suitable local or remote memory component. Each memory 118 may store various objects or data, including classes, frameworks, applications, backup data, business objects, jobs, web pages, web page templates, database tables, process contexts, repositories storing services local to the corresponding network participant server 102, and any other appropriate information including any parameters, variables, algorithms, instructions, rules, constraints, or references thereto associated with the purposes of the corresponding server 102 and its business process application 114.

As illustrated, memory 118*a* includes a message store 142, a local process context 146, and a network participant profile 148. In some implementations, memories 118*b* and 118*c* may also include their own instances of some or all of these components. The message store 142 represents a set of collected messages, signals, and other information sent from the outbound agent 134 and/or received by the inbound agent 126 associated with the business process application 114*a*. In some instances, all messages associated with the networked business process may be stored in the local message store 142, while in other instances, only those messages deemed relevant to or associated with the local business process application 114*a* may be stored therein. The message store 142 may act as a backup or repository for networked business process interactions, allowing the local business process application 114*a* (and other local operations) to quickly access the stored messages and information for any purpose.

The local process context 146, as described above, can store information associated with the process context of a particular local business process application 114*a*, as well as the process context associated with a networked business process of which the local business process application 114*a* is a part. In some instances, the local process context 146 may only store information associated with the local business process application 114*a*. In other instances, the local process context 146 may store or cache information from the virtual process context module 182 and its network process context 184. Depending on the availability of the virtual process context module 182, as well as the age and validity of the local process context information, the context module 138 and the local business process application 114*a* can use the cached network process context information stored in the local process context 146 instead of accessed the network process context 184.

The network participant profile 148 represents a set of metadata and information associated with a particular network participant server 102*a*, its available business process applications 114*a*, and the network participant server's technical capabilities. In some instances, the network participant profile 148 may be generated manually, such as through a definition process of questions and answers presented to and prepared by a representative associated with the corresponding network participant. The network participant profile 148 may also be generated automatically, at least in part, based on known information associated with a particular network participant from the network participant's previous interactions. In some instances, the profile 148 itself may be generated and/or modified using a participant profile generator 190 associated with a network participant profile module 188 located in the set of cloud-based services and information 160 in FIG. 1. As an example, a particular network participant profile 148 may include information and/or metadata defining whether the network participant can publish information associated with start and/or end events, intermediate events and milestones, and error events, as well as provide support for business process termination, business process compensation, and/or ad hoc modification to a business process. An analysis of these, and other criteria and information within the network participant profile 148, can be used by other network participants or automated processes within the set of cloud-based services and information 160 to determine whether a particular network participant or network participant business process application 114 should or can be included in a networked business process. Network participant profiles 148 may also, or alternatively, be stored remotely from the associated network participant, such as in a set of network participant profiles 194 stored in the set of cloud-based services and information 160

The illustrated environment of FIG. 1 also includes one or more clients 150 associated with each of the network participant servers 102. Each client 150 may be any computing device operable to connect to or communicate with at least the corresponding network participant server 102 using a wireline or wireless connection, via the network 155, or another suitable communication means. In some instances, the client 150 may be a part of a particular network participant server 102. In general, each client 150 may include a processor, an interface, a graphical user interface (GUI), and a memory. In general, client 150 comprises an electronic computer device operable to receive, transmit, process, and store any appropriate data associated with the environment 100 of FIG. 1. It will be understood that there may be any number of clients 150 associated with, or external to, environment 100. For example, while illustrated environment 100 includes three clients 150a, 150b, and 150c connected to particular network participant servers 102a, 102b, and 102c, respectively, alternative implementations of environment 100 may include multiple clients communicably coupled to the one or more of the network participant servers 102, as well as other clients 150 not specifically connected to or associated with a particular network participant server 102. In some instances, at least one client 150 may be associated with an administrator of the networked business process, and may be capable of modifying information and data associated with the networked business process, as well as each individual business process application 114. Additionally, there may also be one or more additional clients 150 external to the illustrated portion of environment 100 capable of interacting with the environment 100 via the network 155. Further, the terms "client" and "user" may be used interchangeably as appropriate without departing from the scope of this disclosure. Moreover, while each client 150 is described in terms of being used by a single user, this disclosure contemplates that many users may use one computer, or that one user may use multiple computers.

The GUI associated with each client 150 may comprise a graphical user interface operable to, for example, allow the user of a client 150 to interface with at least a portion of an associated business process application 114 for any suitable purpose, such as inputting and interacting with information and data associated with a particular business process application 114 within a networked business process, as well as any other suitable application. Generally, the GUI provides the particular user with an efficient and user-friendly presentation of business data provided by or communicated within the system. The GUI may comprise a plurality of customizable frames or views having interactive fields, pull-down lists, and buttons operated by the user. For example, the GUI may provide interactive elements that allow a user to interact with a particular business process application 114, the centralized networked business process monitoring system 164, the virtual process context module 182, and/or the network participant profile module 188. The various portions of the associated business process application 114, as well as portions of the overall networked business process, may be presented and accessible to the user through the GUI, such as through a web browser. Generally, the GUI may also provide general interactive elements that allow a user to access and utilize various services and functions of a particular network participant server 102, as well as that server's business process application 114. The GUI is often configurable, supports a combination of tables and graphs (bar, line, pie, status dials, etc.), and is able to build real-time portals, where tabs are delineated by key characteristics (e.g., site or micro-site). Therefore, the GUI contemplates any suitable graphical user interface, such as a combination of a generic web browser, intelligent engine, and command line interface (CLI) that processes information in the platform and efficiently presents the results to the user visually.

As used in this disclosure, each client 150 is intended to encompass a personal computer, touch screen terminal, workstation, network computer, kiosk, wireless data port, smart phone, personal data assistant (PDA), one or more processors within these or other devices, or any other suitable processing device. For example, each client 150 may comprise a computer that includes an input device, such as a keypad, touch screen, mouse, or other device that can accept user information, and an output device that conveys information associated with the operation of the associated network participant server 102, a portion of the set of cloud-based services and information 160, and/or the client 150 itself, including digital data, visual information, or the GUI. Both the input and output device may include fixed or removable storage media such as a magnetic storage media, CD-ROM, or other suitable media, to both receive input from and provide output to users of client 150 through the display, namely, the GUI.

Although not illustrated as such, the client 150 may also include a processor, interface, and memory similar to those described in connection with the network participant servers 102, although alternative implementations of one or more of these components may be used, as well as implementations where additional components may also be included.

FIG. 1 further illustrates several components existing in the set of cloud-based services and information 160. The set of cloud-based services and information 160 comprises shared resources, software, and information provided to network participant servers 102, clients 150, and the various business process applications 114 on-demand. In some instances, some or all of the functionality described in connection with a particular business process application 114 may also be implemented in or with the set of cloud-based services and information 160, such that the particular business process application 114 comprises a cloud-based, on-demand service. In general, the various components of the set of cloud-based services and information 160 may communicate with each other and the non-cloud-based components of environment 100 using application programming interfaces (APIs) and/or through the use of web services and connections. In some instances, each component in the set of cloud-based services and information 160 may be considered a cloud-based application or service.

In the present disclosure, the set of cloud-based services and information 160 includes several on-demand or cloud-based services including a centralized networked business process monitoring system 164, a virtual process context module 182, and a network participant profile module 188. In addition, the set of cloud-based services and information 160 includes several associated information repositories, including a message store 174 associated with the centralized networked business process monitoring system 164, a set of networked business process metadata 176 associated with the centralized networked business process monitoring system 164 and the network participant profile module 188, and a set of network participant profiles 194. The components illustrated in the set of cloud-based services and information 160 may be stored in a single cloud-based network (as illustrated in FIG. 1), while in other implementations, some or all of the components may be distributed between other cloud-based networks, locations, and services, as well as in or with one or more of the illustrated network participant servers 102.

At a high level, the centralized networked business process monitoring system 164, the virtual process context module 182, and the network participant profile module 188 are any applications, programs, modules, processes, or other software that may execute, change, delete, generate, or otherwise manage information associated with networked business processes that include business process applications 114 across a plurality of network participants in order to provide more transparent interactions between inter-company or inter-entity transactions and operations. The centralized networked business process monitoring system 164, the virtual process context module 182, and the network participant profile module 188 may be separate components in some implementations (as illustrated in FIG. 1), while in other implementations, may be comprised of fewer or additional components. Further, different implementations of environment 100 may include a subset of the elements within the set of cloud-based services and information 160 described herein.

The centralized networked business process monitoring system 164 is a centralized location for monitoring the operations of each business process application 114 interacting in a networked business process. In general, the centralized networked business process monitoring system 164 is provided information associated with the interrelatedness of the various network participant servers 102 and their corresponding business process applications 114, and acts as a central hub or relay for providing information associated with those applications' 114 outputs and statuses within the networked business process environment. The centralized networked business process monitoring system 164 allows individual applications 114 to send a single instance of a message or signal into the set of cloud-based services and information 160, at which the centralized networked business process monitoring system 164 receives the information and determines which of the other network participants associated with the networked business process should receive the information.

As illustrated, the centralized networked business process monitoring system 164 can include a receiving module 168 and a broadcast module 172. The receiving module 168 may be an interface or other known location to which information is sent from the various network participant servers 102 associated with a networked business process. In some current systems, the information is directly transmitted to each of the related network participant servers 102 by the sending network participant server 102. In the present disclosure, the information may be sent once (e.g., by a single message or signal) to the receiving module 168, where the information is received and, in some cases, stored within a cloud-based message store 174.

Once received, the centralized networked business process monitoring system 164 can analyze the received information to determine which of the network participant servers 102 and/or specific business process applications should be sent or notified of the received message or information. To that end, the centralized networked business process monitoring system 164 includes a broadcast module 172. The broadcast module 172 can send the message or information received by the monitoring system 164 to the identified network participant servers 102 and/or business process applications 114. Alternatively, the broadcast module 172 can provide notifications to particular network participant servers 102 and/or business process applications 114 that new messages and/or information are available, allowing the associated business process application 114 and network participant servers 102 to retrieve the message and/or information individually. Additionally, the broadcast module 172 may set a parameter or other value within the monitoring system 164 associated with an updated set of networked business process information. One or more of the outbound agents 134 associated with various network participant servers 102 may poll the monitoring system 164 at regular and/or predefined intervals, or in response to an event, and, in response to the identifying that a modified value or set of data is available, request the updated information. In some instances, the set parameter may specify a subset of all network participant servers 102 associated with the updated information, allowing network participant servers 102 to immediately determine whether a request to the centralized networked business process monitoring system 164 is necessary.

The networked business process monitoring system 164 may also be able to perform networked business process analyses to determine whether the network participants and/or business process applications 114 are performing satisfactorily. For example, the various messages and information received by the monitoring system 164 may include status information associated with the different business process applications 114 executing in the networked business process, in addition to data output by the operations associated with those applications 114. The networked business process may be associated with a set of networked business process metadata 176 defining information regarding the interactions and requirements of the networked business process as a whole, as well as the individual business process applications 114. In some instances, certain requirements or milestones associated with individual business process applications 114 may be defined, such as performance time and standards. The monitoring system 164, using the information received from the various business process applications 114, may be able to analyze whether certain performance indicators, such as time requirements or performance requirements associated with service level agreements between companies and participants, have been met. In other instances, the monitoring system 164 can use the status and output information received from the various business process applications 114 to diagnose issues within the networked business process, such as bottlenecks, errors, and other system-relevant issues within the inter-company or inter-entity-based networked business process. If issues are identified by the monitoring system 164, appropriate network participants and/or administrators may be notified to allow for the issues to be rectified. These analyses performed by the monitoring system 164 provide inter-company awareness and knowledge of the processes and applications performed by other network participants, thereby removing the previous black box situations in prior systems and providing increased transparency to each network participant. The messages and information associated with the centralized networked business process monitoring system 164, and the networked business processes in general, may be provided as Extensible Messaging and Presence Protocol (XMPP) messages. Alternative implementations may use any other suitable messaging protocol, such as email-based messaging.

As previously described, the set of cloud-based services and information 160 includes a virtual process context module 182. The virtual process context module 182 provides a process context shared between business processes and business process applications 114 included in and associated with a networked business process. In general, context information is provided by, shared, and accessed by each of the individual business process applications 114 via web service requests sent through network 155. Each virtual process context module 182 may include more than one network process context 184, with each network process context 184 associated with a different networked business process, or alternatively, a different instance of the same networked business process. Each network process context 184 may provide access rights to users, clients, and business process applications 114 associated with the corresponding networked business process (or instance thereof), and may prevent access to stored data objects and other information stored therein to requests made by non-associated applications and/or entities. In some instances, the virtual process context module 182 may send updated context data to associated applications 114 and network participant servers 102 when modifications to the network process context 184 are made. Alternatively and/or additionally, the virtual process context module 182 can notify, or otherwise signal, to associated applications 114 and network participant servers 102 that modifications to a network process context 184 have been made without sending the updated information. In some instances, the notification may include information that can allow the network participant server 102 and/or the business process application 114 to determine if a retrieval of the updated network process context 184 is needed. In some instances, the virtual process context module 182 may communicate with one or more local context modules 146 located at the associated network participant servers 102 to provide the information directly.

The set of cloud-based services and information 160 further includes the network participant profile module 188. The network participant profile module 188 provides tools and functionality for analyzing the quality of services capable of being—or already—provided by a potential or current network participant and/or a particular business process application 114 associated with a potential or current network participant. The network participant profile module 188 can generate new network participant profiles (e.g., 148 or 194) and analyze existing network participant profiles to determine if the corresponding network participant is allowed to be included in an existing or newly-created networked business process. As described above, various types of information associated with a network participant and/or a business process application can be included in a network participant profile 194. For example and as described above, a network participant profile 194 may include information and/or metadata defining whether the network participant can publish information associated with start and/or end events, intermediate events and milestones, and error events, as well as provide support for business process termination, business process compensation, and/or ad hoc modification to a business process. In general, this information describes the relative transparency of a network participant or its associated applications 114 and the network participant's ability to provide transparent services to a networked business process. Additionally, the information in a particular profile 194 may also be associated with other any other performance- and/or cost-related metrics or capabilities.

The network participant profile module 188 includes a participant profile generator 190 and a participant profile analyzer 192. The participant profile generator 190 can comprise a web-based service or application allowing a representative of a network participant to register with the network participant profile module 188 and provide information on the capabilities of its network participant server 102 and/or its business process applications 114. In some instances, the participant profile generator 190 may generate at least a portion of some network participant profiles 194 automatically based on information provided by other network participants determined or derived by previous experiences or interactions with the network participant, as well as based on an analysis of a particular business process application 114 associated with the network participant and its associated server 102. In some instances, a network participant profile 194 may be imported by the participant profile generator 190

The participant profile analyzer 192 is a tool used by the network participant profile module 188 to determine if a proposed network participant provides capabilities as required or preferred by a networked business process. The participant profile analyzer 192 may be used in different situations, such as when a networked business process is being expanded to add additional functionality. For example, if a new network participant is needed to provide a new operation or business process application, the participant profile analyzer 192 retrieves, from the set of networked business process metadata 176, information on the parameters 177 required by and/or preferred by a particular networked business process combination. Those parameters 177 can be defined when a networked business process is originally designed, as well as any other suitable time. Once the parameters 177 are identified, the potential network participant's network participant profile 194 is compared to the set of parameters 177. If one or more of the required parameters are not met by the network participant profile 194, the potential network participant may be rejected or indicated as insufficient according to the parameters 177. If one or more of the preferred parameters are not met, the participant profile analyzer 192 may perform an algorithm to determine the level of transparency provided by the potential network participant profile 194 in light of the preferred parameters 177. Certain networked business processes may be associated with a minimum threshold value as determined by the participant profile analyzer 192. If the algorithm determines that the level of transparency provided by the potential network participant profile 194 falls below that minimum threshold, then that participant may be rejected. If, however, the level of transparency is determined to be greater than the minimum threshold, then the associated network participant may be considered for addition to the networked business process.

In some instances, the participant profile analyzer 192 may also be used when determining a potential replacement to an existing network participant. An outgoing network participant and associated business process application 114 may be identified, such as when a particular network participant and its business process application 114 fail to meet certain performance metrics as determined by the centralized networked business process monitoring system 164. A set of potential replacement network participants and/or business process applications 114 may then be identified based on the functionality to be replaced. In some instances, the participant profile analyzer 192 may perform the functionality associated with identifying potential replacements, while in other instances, another module or application may do so. Once the set of potential replacement network participants and associated business process applications are determined, the participant profile analyzer 192 can compare each of the potential replacement network participants to the parameters 177 defined for the underlying networked business process. The participant profile analyzer 192 may then rank the potential replacement network participants based on their corresponding scores or compatibility values as determined by the algorithm associated with the participant profile analyzer 192. An administrator or set of administrators can then review and use the ranking information to determine a preferable replacement for the networked business process. In some instances, the participant profile analyzer 192 may be used to find the best network participant profile matching a combination of required and preferred networked business process criteria, including criteria associated with the relative transparency of the participant or process. The determination of a potential replacement network participant may be performed in connection with a determination from the centralized networked business process monitoring system 164 that one or more current network participants are not meeting performance requirements, allowing the network participant profile module 188 and the monitoring system 164 to work together to suggest replacements for underperforming network participants and/or business process applications 114.

While FIG. 1 is described as containing or being associated with a plurality of elements, not all elements illustrated within environment 100 of FIG. 1 may be utilized in each alternative implementation of the present disclosure. For example, although FIG. 1 depicts a cloud-based environment implementing the various tools and functionality of the present disclosure, any of the components within the set of cloud-based services and information 160 can be located in a specific, non-cloud-based server within environment 100. Further, although FIG. 1 depicts network participant servers 102 external to network 155, servers may be included within the network 155 as part of a cloud computing network solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 3:
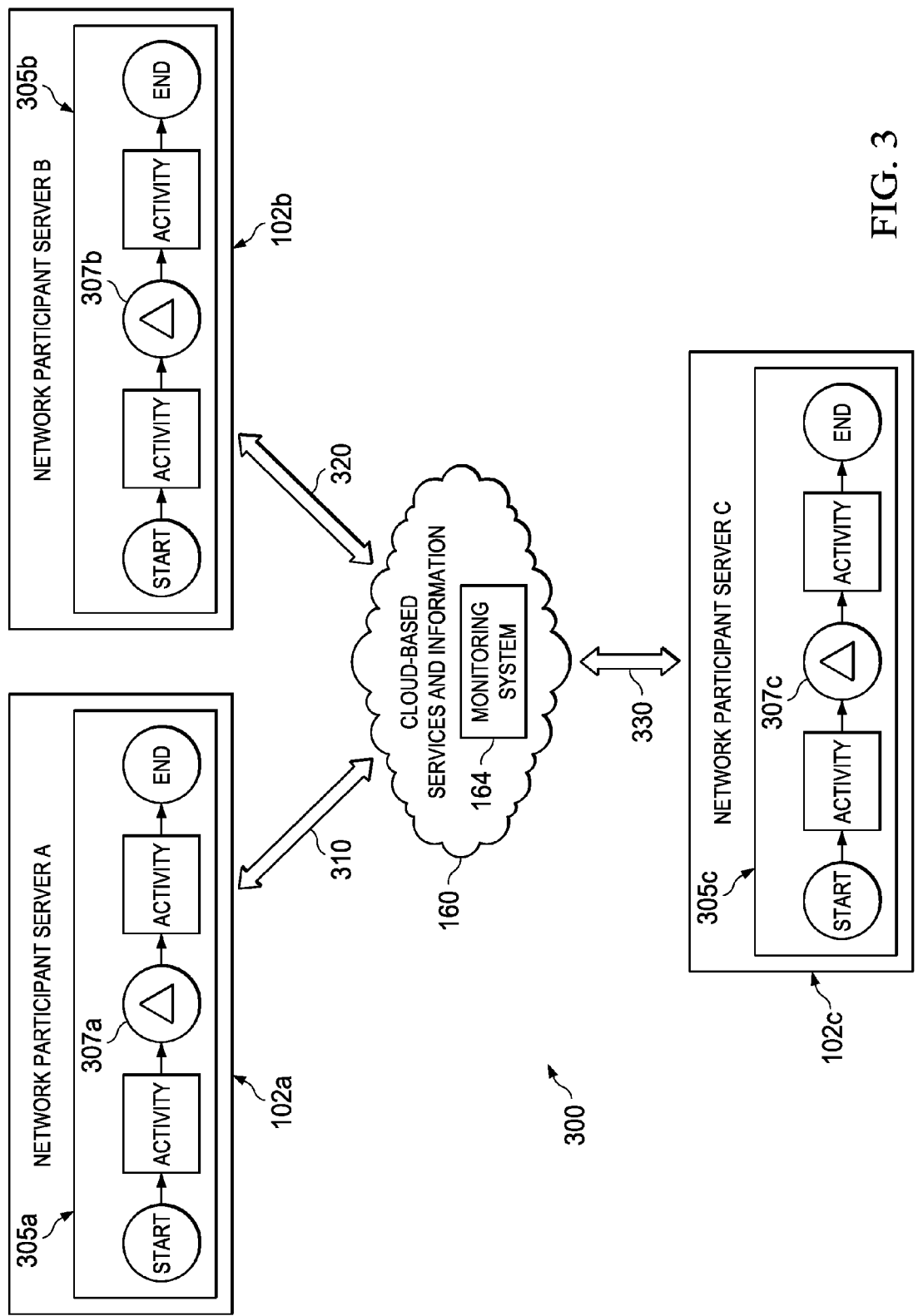
FIG. 3 is an illustration of an example system implementing business interaction monitoring within a networked business process.

FIG. 3 is an illustration of an example system 300 implementing business interaction monitoring within a networked business process. As illustrated, three network participant servers A, B, and C (102a, 102b, and 102c, respectively) are associated in a networked business process, with each of the network participant servers 102 interacting with the centralized networked business process monitoring system 164 located in the set of cloud-based services and information 160. Each of the network participant servers 102 include and provide a business process application (305a, b, and c, respectively) to the networked business process. In the current example of FIG. 3, each business process application 305 includes a single intermediate event 307 operable, when the corresponding business process application 305 is executed, to provide a signal or message to the monitoring system 164.

One example of the business interaction monitoring can be described in the context of switching electricity providers. Using the illustration of FIG. 3, network participant server A 102a is associated with a current electricity retailer associated with a customer, network participant server B 102b is associated with a new electricity retailer associated with the customer, and network participant server C 102c is associated with an electricity provider or distributor. The overall networked business process is associated with switching electricity providers based on a request submitted by the customer. In some instances, the associated switch process may have a required or preferred deadline for completion. For purposes of the illustrated example, the time to complete a switch based on a customer's request is no longer than six weeks.

The first business application process 305a associated with the current electricity retailer is initiated based on the request from the customer. Once a first activity of the first business application process 305a is completed, an intermediate event 307a is used to send a message or other signal to the business interaction monitoring system 164 (as illustrated by arrow 310). In some instances, this message may be provided in XMPP or any other suitable messaging protocol. The business interaction monitoring system 164 can determine, based on the received signal, that two concurrent business process applications, 305b and 305c, should be initiated. The monitoring system 164 sends process initiating messages to the respective start events of business process applications 305b and 305c (as illustrated by arrows 320 and 330), where the choreography of the messages to be sent by the monitoring system 164 is based on the known relationships and interactions between the individual processes included in the networked business process. In addition to providing information on when the other network participant processes 305b and 305c are to begin, the signal or message provided by the intermediate event 307a can provide information for an analysis of the networked business process. One example is the time taken from the customer's request until the message sent from intermediate event 307a is sent, which may indicate the time taken to complete the first activity in the corresponding business process application 305a.

Similar messages and signals may be sent when the second processes reach their associated intermediate events 307b and 307c, respectively, providing additional information to the monitoring system 164 on the overall networked business process. In some instances, information generated by steps or operations within one business process application 305 may be sent to another business process application 305 as input associated with a particular activity or operation. As the new electricity retailer (using business process application 305b) creates a new account for the customer and prepares the first provision of services, the intermediate event 307b may be triggered and send a message via the monitoring system 164 to the energy provider's corresponding business process application 305c indicating that a change to the retailer associated with the customer should occur. Multiple messages and signals 310, 320, and 330 may be associated with the various intermediate events and end events of the associated business process applications 305.

In general, any milestone within the respective applications may be represented by an intermediate event with a related message or signal sent to the monitoring system. The intermediate events can be used to provide additional transparency, as well as provide analytics associated with the overall networked business process and the individual business process applications 305. For example, various milestones can be monitored and compared to key performance indicators (KPIs), service level agreements (SLAs), and other metrics. These comparisons can provide valuable information on whether a particular networked business process is performing adequately, as well as whether one or more of the business process applications 305 need to be replaced or modified for better performance. At the same time, the monitoring system 164 can provide transparent information associated with the status of both the networked business process and individual business process applications 305.

Figure 4:
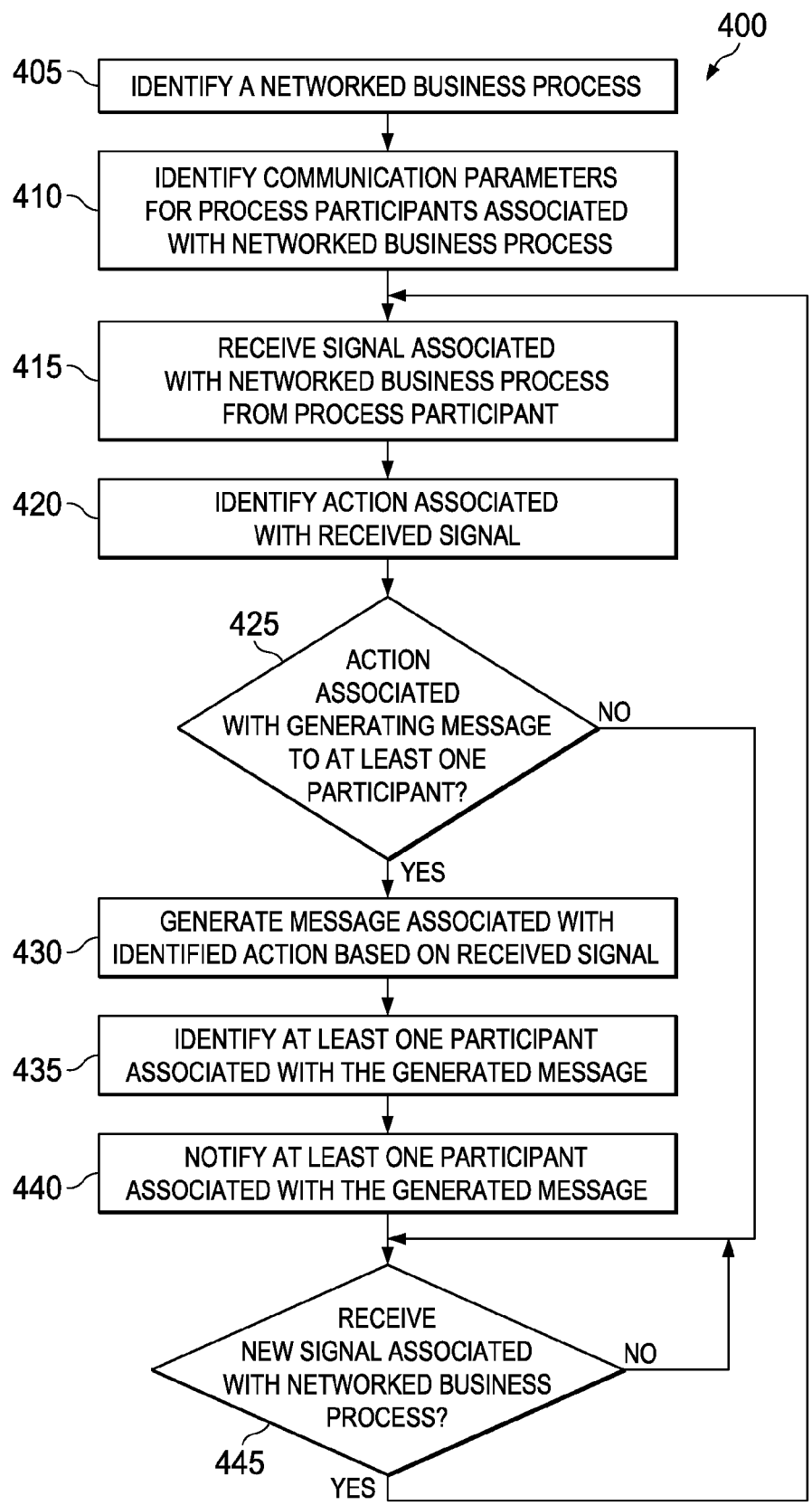
FIG. 4 is a flowchart of an example process for monitoring the interactions of a networked business process from the perspective of a centralized monitoring system.

FIG. 4 is a flowchart of an example process or method 400 for monitoring the interactions of a networked business process from the perspective of a centralized monitoring system, such as the systems illustrated in FIG. 1 and FIG. 3. For clarity of presentation, the description that follows generally describes method 400 in the context of environment 100 illustrated in FIG. 1 from the perspective of the centralized networked business process monitoring system 164. However, it will be understood that method 400 may be performed, for example, by any other suitable system, environment, or combination of systems and environments, as appropriate.

At 405 a networked business process is identified. The networked business process may be identified by generating or creating a new networked business process by an administrator or process developer combining and/or associating two or more individual business processes or business process applications into a single, networked business process performed across the two or more business processes. The particular networked business process may also be identified or selected from a set of predefined networked business processes.

At 410, communication parameters for the process participants associated with the networked business process are identified. Identifying the communication parameters may include identifying events, activities, signals, messages, and/or outputs to be received from one or more process participants performing various business processes included within the networked business process, and determining where the received information is to be forwarded or relayed. Determining where the received information is to be forwarded or relayed may include identifying the type of information that is to be provided to which of the individual business processes, as well as the locations within those individual business processes to which the information is to be forwarded or relayed. In some instances, the information may be sent to a start event associated with a particular individual business process, while in other instances, the information may be sent to an activity or operation included after the start event of a particular individual business process. Still further, identifying the communication parameters associated with the various process participants may include determining the type of communication (e.g., XMPP message, email message, etc.) compatible with the receiving entity or process participant. Different types of communication protocols and methods may be used when relaying or delivering information to different process participants, such that a first process participant may receive information in a first protocol, while a second process participant may receive information in a different, second protocol.

At 415, a signal or message associated with the networked business process is received from a particular process participant. The signal or message received from the particular process participant may be in any suitable format or protocol. In some instances, different process participants and business processes or process applications may provide information to the centralized networked business process monitoring system in different formats. In some instances, all communications may be in the same protocol or format, while in other instances, different types of communications may be received from different process participants, as well as different types of communications associated with different events from the same process participant.

At 420, an action associated with the received signal or message is identified. In some instances, the action associated with the received signal or message may be to store the information in a signal or message store, or to store information associated with the received signal or message in a database for later use or analysis. In other instances, the action associated with the received signal or message may cause a response signal or message to be sent to one or more of the process participants. In some particular instances, the action associated with the received signal or message may be to send a response signal, message, or other communication back to the process participant associated with the received signal or message.

At 425, a determination is made as to whether the identified action is associated with generating a responsive or related message or signal to at least one process participant. If the determination indicates that no new message or signal is to be generated, method 400 continues at 440. If, however, the identified action is associated with generating a responsive message or signal based on the received message or signal, method 400 continues at 430.

At 430, a message, signal, or other set of information associated with the identified action and based on the received signal or message is generated. At 435, at least one process participant associated with the generated message is identified. In some instances, the actions associated with the received signal or message may be based on particular interactions within various process participants in the networked business process. To determine where the generated message or signal is to be relayed or sent, the interactions governing the networked business process may be consulted or reviewed by the monitoring system. As noted, at least one process participant associated with the generated message is identified. In some instances, responsive messages may be relayed, published, or made available to all process participants, with each process participant performing a filtering operation to determine if the generated message or signal is associated with that particular process participant. Alternatively, the generated message or signal may be sent only to those process participants to whom the generated message or signal is directly associated. Still further, in some instances the generated message or signal (or other information) is not sent to any process participants. Instead, the fact that the message or signal has been generated is made available, with the process participants able to retrieve or access the generated message or signal.

Once the at least one process participant associated with the generated message is identified, the at least one process participant associated with the generated message or signal is notified of the message or signal at 440. As stated above, in some instances notifying the at least one process participant associated with the generated message comprises sending the generated message to the at least one associated process participant. In other instances, notifying the at least one process participant associated with the generated message comprises sending a notification to the at least one associated process participant, and thereafter allowing the at least one associated process participant to access the generated message or signal. In still other instances, neither the generated message or signal nor a notification thereof may be sent to the associated process participant. Instead, the monitoring system may provide an updated set of information at the monitoring system available to all process participants. By polling the monitoring system, the process participants can determine whether a message or signal associated with a particular process participant is available, and if so, request or retrieve the generated message or signal.

At 445, a determination is made as to whether a new message or signal associated with the networked business process is received. If a new message or signal is received, method 400 returns to 415. If no new message or signal is received, method 400 continues, or loops, at 445 until the next message is received. Although not illustrated in method 400, the centralized networked business process monitoring system may also perform an analysis on each received message or signal, including, in some instances, identifying the source of the message or signal, identifying or storing the information included in the received message or signal, and deriving at least one performance metric associated with the networked business process or a particular individual business process.

Figure 5:
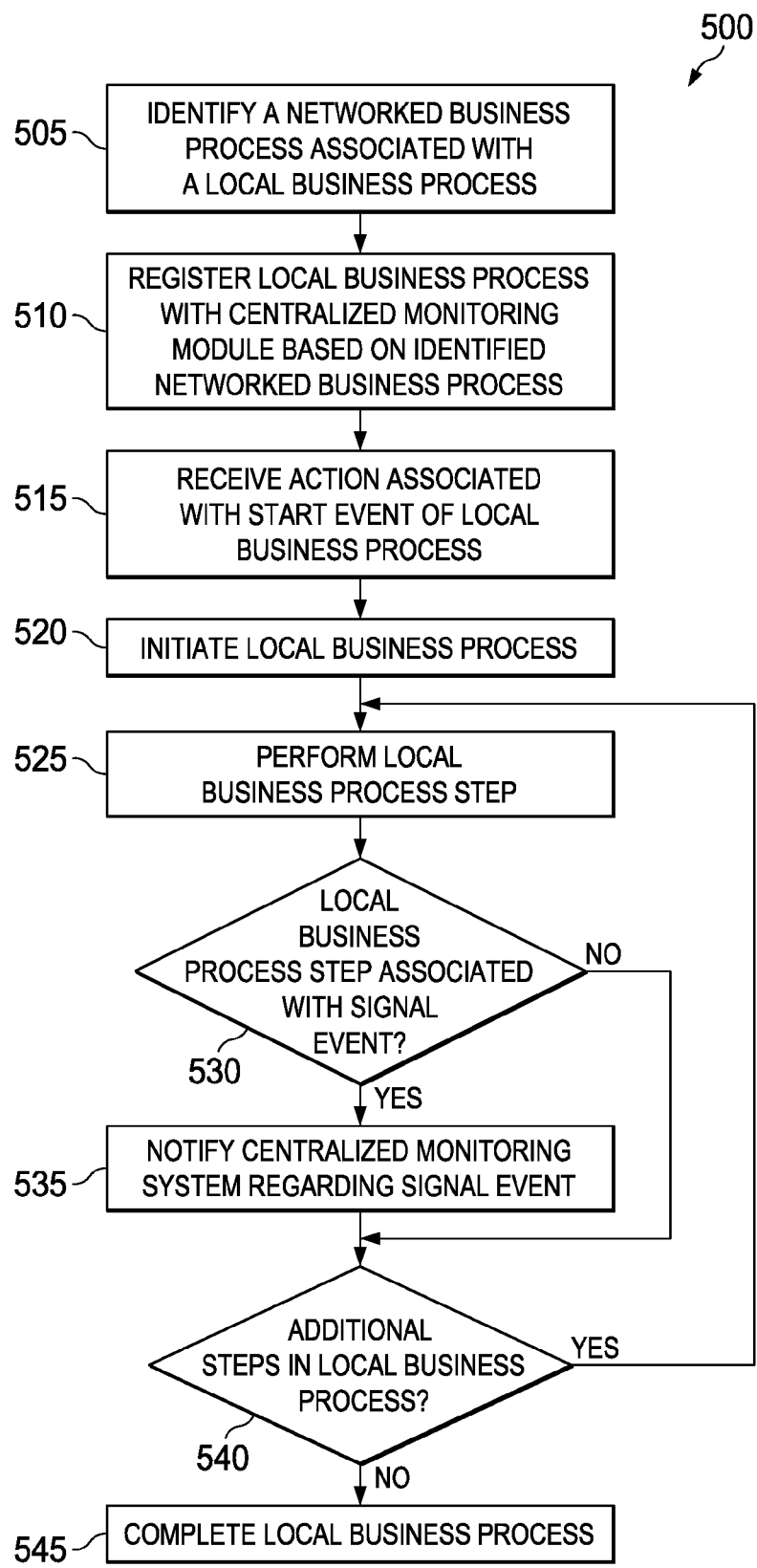
FIG. 5 is a flowchart of an example process associated with a centralized business interaction monitoring system from the perspective of a network participant.

FIG. 5 is a flowchart of an example process 500 associated with a centralized business interaction monitoring system from the perspective of a network participant. For clarity of presentation, the description that follows generally describes method 500 in the context of environment 100 illustrated in FIG. 1 from the perspective of a network participant (or network participant server 102). However, it will be understood that method 500 may be performed, for example, by any other suitable system, environment, or combination of systems and environments, as appropriate.

At 505, a networked business process associated with a locally executed business process (or business process application) is identified. At 510, the locally executed business process, or local business process, is registered with a centralized networked business interaction monitoring system based on the identification of the associated networked business process. As described above, the centralized networked business interaction monitoring system provides transparency to all participants within the identified networked business process, allowing status information about the various business processes executing portions of the networked business process to be shared among the various process participants. Additionally, information provided to the centralized networked business interaction monitoring system allows various analytics and performance analyses to be identified and performed on both the local business process and the overall networked business process, providing additional feedback to administrators, developers, and users as to the effectiveness and quality of the networked business process. In some instances, registering the local business process with the monitoring system provides information to the monitoring system with regard to the operations and activities performed by the local business process, as well as the types of signals and messages that will be generated thereby. Further, the registration may provide the centralized monitoring system with information defining the messaging and signaling protocols and formats associated with the local business process.

At 515, an action or indication associated with a start event of the local business process is received. In some instances, the action or indication may comprise a message or signal received from the centralized monitoring system in response to a message or signal received from another business process of the networked business process. In other instances, the action or indication may be received from a client or user associated with the local business process, through which the networked business process is begun.

At 520, the local business process is initiated in response to the action or indication received at 515. In some instances, initiating the local business process may also initiate the networked business process, such as when the local business process represents the initial steps or operations in the networked business process. In other instances, the local business process may instead be a continuation of the networked business process, and may initiate the local business process based on a message or signal received from another business process in the networked business process. Further, the message or signal received from the other business process in the networked business process may include or define initial parameters or values to be used in the local business process. Initiating the local business process may comprise initiating the local business process according to the parameters or values received from another business process within the networked business process.

At 525, a local business process step is performed, including any activities or operations associated with the step. At 530, a determination is made as to whether the performed local business process step is associated with an intermediate or other event that causes a message or signal to be sent to the centralized monitoring system. If no message or signal is to be sent, method 500 moves to 540. If, however, a message or signal associated with the local business process step is to be sent, method 500 moves to 535, where the centralized monitoring system is notified of the event and its associated message. Notifying the centralized monitoring system may include sending a message or signal directly to the centralized monitoring system as part of the local business process step. In other instances, notifying the centralized monitoring system may comprise providing the information associated with the step to an outbound agent and/or message filter module which in turn processes, formats, and sends the information associated with the performed local business process step to the centralized monitoring system. In some instances, each local business process step may be determined to be associated with a signal event or message, such that the information associated with the performed step is provided to the outbound agent or message filter module. Once at the outbound agent or message filter module, a determination may then be made as to whether the information should actually be forwarded to the centralized monitoring system. Once the centralized monitoring system is notified, method 500 continues at 540.

At 540 a determination is made at to whether there are additional steps or activities in the local business process. If additional steps remain, method 500 returns to 525, where the next local business step is performed. If no additional steps remain, method 500 ends at 545, where the local business process is completed. In some instances, completing the local business process may include providing a final set of data, or a final message or signal, to the centralized monitoring system. In some instances, the final data, message, or signal may be relayed to another business process within the networked business process and/or stored in a message or data store in a cloud-based system, either for backup purposes or for performing analytics on the local business process and/or the overall networked business process.

Figure 6:
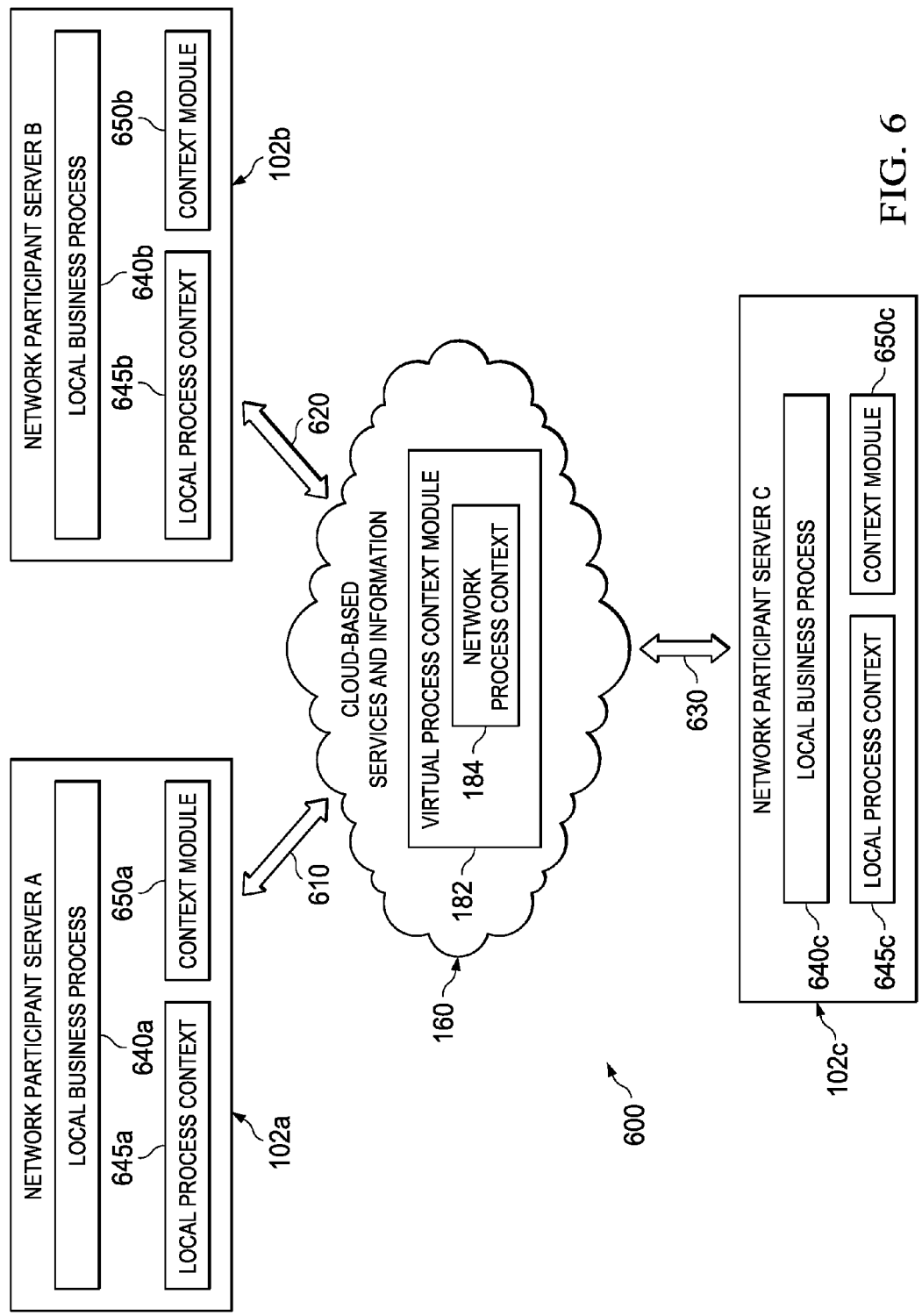
FIG. 6 is an illustration of an example system implementing a network-based process context across multiple network participants associated with a networked business process.

FIG. 6 is an illustration of an example system 600 implementing a virtual process context across multiple network participants for a networked business process. As illustrated, three network participant servers A, B, and C (102*a*, 102*b*, and 102*c*, respectively) are associated in a networked business process, with each of the network participant servers 102 interacting with the virtual process context module 182 located in the set of cloud-based services and information 160. Each of the network participant servers 102 includes and provides a local business process application (640*a*, *b*, and *c*, respectively) as part of an overall networked business process. In the current example of FIG. 6, each local business process application 640 is associated with a local context module 650 and a local process context 645.

The virtual process context module 182 includes a network process context 184. As described above, the network process context 184 is associated with the networked business process and stores and makes available to process participants the data objects, including both structured and unstructured data, that is used or manipulated during the execution of the networked business process, and, by extension, the multiple local business processes 640. In some instances, the context modules 650 associated with each of the local business processes 640 may be used to access, store, and retrieve the data directly from the network process context 184 as needed during execution of the corresponding local business process 640. In some instances, concurrently executing local business processes 640 may modify one or more data objects at various times. In order to provide the most up-to-date data objects for the concurrently executed local business processes 640, the associated one or more data objects can be maintained within the network process context 184 in the set of cloud-based services and information 160. The local process contexts 645 may be used as a local backup to the networked process context 184 in cases where the virtual process context module 182 is unavailable, due to a lack of connection with the set of cloud-based services and information 160 or any other possible reason. Each local process context 645 can be maintained by the corresponding context module 650 to provide quick and efficient local access to the current data objects.

As illustrated by arrows 610, 620, and 630, each of the network participant servers 102 can send information to, access, or retrieve information from the network process context 184. In some instances, the virtual process context module 182 may authenticate the requesting entity prior to providing access to the network process context 184, ensuring that the network process context 184 is accessible only to those network participants and processes associated with the networked business process. Additionally, when modifications are made to data objects within the network process context 184, the virtual process context module 182 may, in some instances, notify the associated process participants of the modified network process context 184. Thus, each process participant and local business process 640 may be kept up-to-date as to the current status of the network process context 184 and any changes to the data objects therein.

In some instances, a notification of the modified network process context 184 may be sent to the each local context modules 138 associated with the local business process 640. Alternatively, notification of the modification may only be sent to particular local context modules 138 associated with the local business process 640 that are directly affected by the modification. The notification may include a message or set of information defining the changes themselves, or a message or signal that modifications have occurred, thus allowing the context modules 650 themselves to access the virtual process context module 182 in order to access and retrieve the modifications to the network process context 184. One advantage of the virtual process context module 182 may be to provide a transparent, but shared, process context that allows the related local business processes 640 to share and access the network process context 184 in a manner similar to how a local process context 645 is accessed. In the present instance, the virtual process context module 182 can be accessed through a web or on-demand service to virtualize the access to the single network process context 184 for each of the process participants and local business processes 640.

Figure 7A:
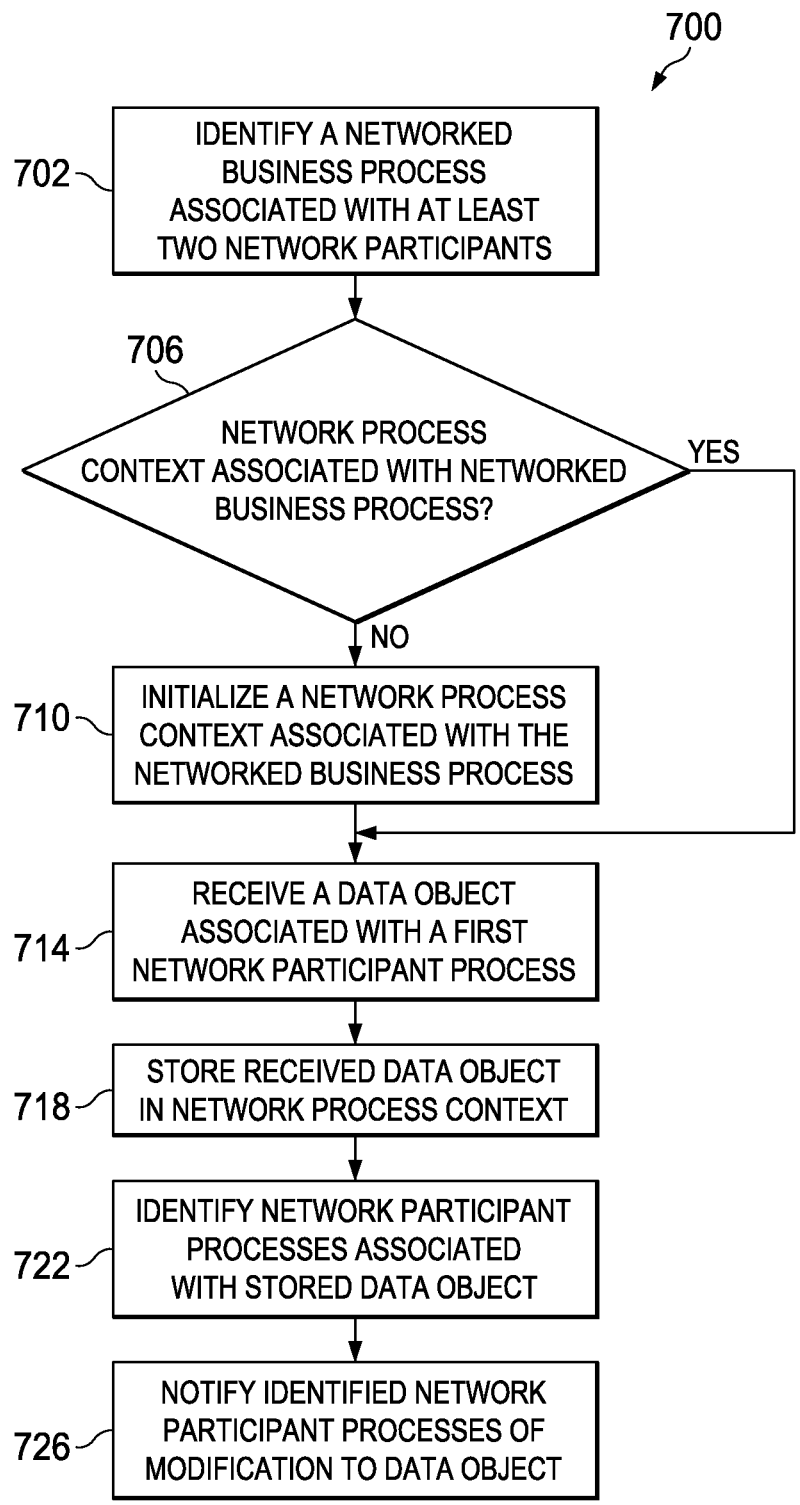
FIG. 7A is a flowchart of an example process for initializing and interacting with a network process context in a networked business process associated with a plurality of network participants from the perspective of a virtual process context module.

FIG. 7A is a flowchart of an example process 700 for initializing and interacting with a virtual process context in a networked business process associated with a plurality of network participants. For clarity of presentation, the description that follows generally describes method 700 in the context of environment 100 illustrated in FIG. 1 from the perspective of a virtual process context module. However, it will be understood that method 700 may be performed, for example, by any other suitable system, environment, or combination of systems and environments, as appropriate.

At 702, a networked business process associated with at least two network participants (and their local business processes, or network participant processes) is identified. In some instances, identifying the networked business process may include associating or linking the identified networked business process with the virtual process context module, as well as creating or generating the networked business process itself. In some instances, associating or linking the identified networked business process with the virtual process context module may occur automatically in response to the creation or design of a networked business process, or may be performed manually by an administrator or designer associated with the identified networked business process.

At 706, a determination is made as to whether a network process context is associated with the identified networked business process. In some instances, a network process context may be generated when the networked business process is identified at 702. For example, the identified networked business process may already be associated with a network process context. If a network process context is determined to be associated with the networked business process, then method 700 continues at 714. If, however, the networked business process does not have an associated network process context, method 700 continues at 710.

At 710, a network process context associated with the identified networked business process is initialized. In some instances, 710 may not occur until the first local business process associated with the overall networked business process is started. Stated otherwise, the network process context for the identified networked business process may not be initialized until the identified networked business process is itself initiated. Initializing the network process context associated with the networked business process may include creating a network process context specifically associated with the networked business process, its network participants, and their associated local business process and business process applications. In some instances, the virtual process context module may maintain and manage multiple network process contexts, with each network process context associated with a different networked business process and/or different instances of a particular networked business process.

At 714, a data object associated with a first network participant process included in or associated with the networked business process is received by the virtual process context module. At 718, the virtual process context module stores the received data object in the network process context associated with the networked business process. In some instances, different portions of the network process context may be associated with different types of data objects, as well as data objects associated with different portions of the networked process context. The virtual process context module may determine where or how to store the received data object to allow other participant processes within the networked business process to access the data.

At 722, the virtual process context module identifies one or more network participant processes associated with the received and stored data object. In some instances, all participant processes may be identified as associated with the data object. Alternatively, only a subset of the participant processes within the networked business process may be identified as associated with the data object. For example, if the data object is only relevant to and used in a business process associated with a first participant process, but is not used in business processes associated with a second and third participant process, then only the first participant process may be identified at 722. The relevance of a particular data object to various participant processes may be identified in the networked business process model, metadata, or elsewhere. If there is no information defining the relevancy of a particular data object to a particular set of participant processes, all participant processes within the networked business process may be identified.

At 726, the identified network participant processes associated with the data object are notified of the data object's addition and/or modifications. Notifying the identified network participant processes associated with the data object allows the network process context to be shared within the networked business process. Notifying the identified network participant processes may include transmitting a copy of the stored data object to the context modules associated with the identified network participant processes, thereby allowing the network participant processes to have immediate access to the data object. The notification may also or alternatively comprise a notice, or message, indicating to the network participant process that a data object associated with that network participant process has been modified. Where notifying the identified network participant processes does not include a copy of the data object, the identified network participant processes may access the network process context immediately to retrieve or read the data object, or the identified network participant processes may wait to access the network process context for the data object until the data object is needed or is to be used in the corresponding network participant process. In some instances, the data object can be read from the network process context as the network participant process is performing operations associated with or based on the data object.

Figure 7B:
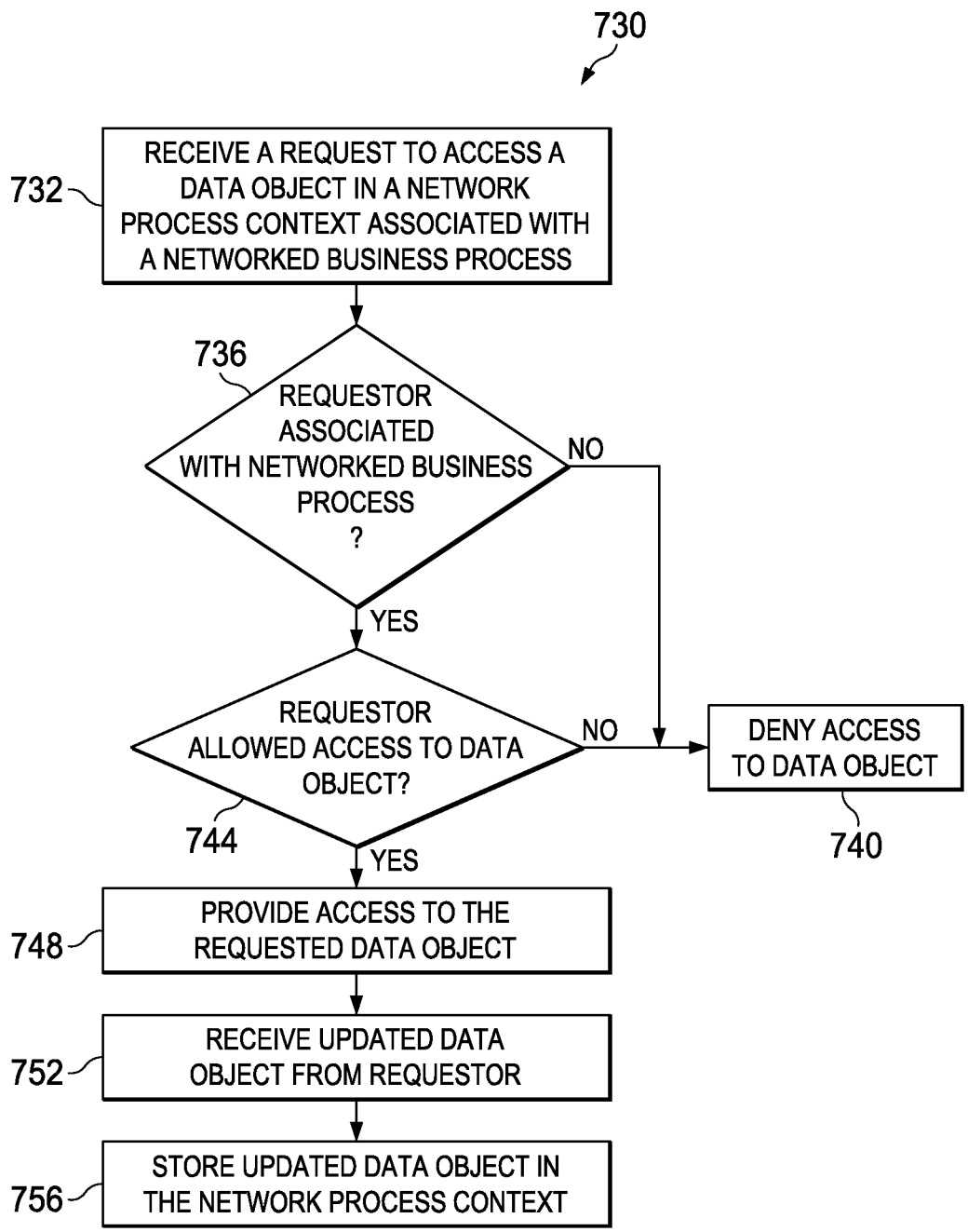
FIG. 7B is a flowchart of an example process for allowing or denying access to data objects within a network process context associated with a plurality of network participants from the perspective of a virtual process context module.

FIG. 7B is a flowchart of an example process or method 730 for allowing or denying access to data objects within a network process context associated with a plurality of network participant processes within a networked business process. For clarity of presentation, the description that follows generally describes method 730 in the context of environment 100 illustrated in FIG. 1 from the perspective of a virtual process context module. However, it will be understood that method 730 may be performed, for example, by any other suitable system, environment, or combination of systems and environments, as appropriate.

At 732, a request to access a particular data object within a network process context is received. The request for access to the data object may be sent based on a notification sent to one or more network participant processes. In other instances, the request may be received at the start of a networked business process from a particular network participant process to retrieve information on an initial or updated set of preliminary information and/or data objects stored at the network process context.

At 736, a determination is made as to whether the requestor is associated with the networked business process and, by extension, the network process context. If the requestor is not associated with the networked business process, method 730 continues at 740, where access to the data object is denied. If, however, the requestor is associated with the networked business process, then method 730 continues at 744, where a determination is made as to whether the requestor is allowed access to the particular, requested data object. In some instances, some data objects stored within the network process context may only be accessible to a subset of the network participant processes included within the networked business process. For example, a network participant process unrelated to a particular data object may not have access rights associated with that data object in order to provide protection from inadvertent modifications and/or unauthorized access. If it is determined that the requestor is not allowed access to the data object, then method 730 continues at 740, where access to the data object is denied. If, however, the requester is associated with the networked business process and is allowed access to the requested data object, method 730 continues to 748.

At 748, access to the requested data object is provided. The level of access to the data object provided to different requestors may differ based on the needs and rights of the requestor. For example, the requestor may provided read-only rights, allowing access to the data object, but not the ability to modify it. In some instances, each participant process may have the ability to access each data object within the network process context, with only some network participant processes having the ability to modify and manipulate the data object.

At 752, an updated data object and/or new data objects are received from the requestor. In some instances, the updated data object and/or new data objects may be received after the requestor performs one or more operations within an associated network participant business process based on or related to the accessed data object. Once the updated data object is received, the updated data object is stored in the network process context at 756. Although not illustrated as such in FIG. 7B, additional operations similar to 722 and 726 of FIG. 7A may be performed in order to notify one or more network participant processes of the changes and modifications to data objects within the networked business process. Still further, both methods 700 and 730 can be performed in multiple instances, in which some of those instances operate concurrently, in order to provide information associated with a plurality of network participant processes performed simultaneously. In other words, the virtual process context module may be capable of handling multiple simultaneous requests and updating different data objects during the execution of multiple interrelated participant business processes within the networked business process.

Figure 8:
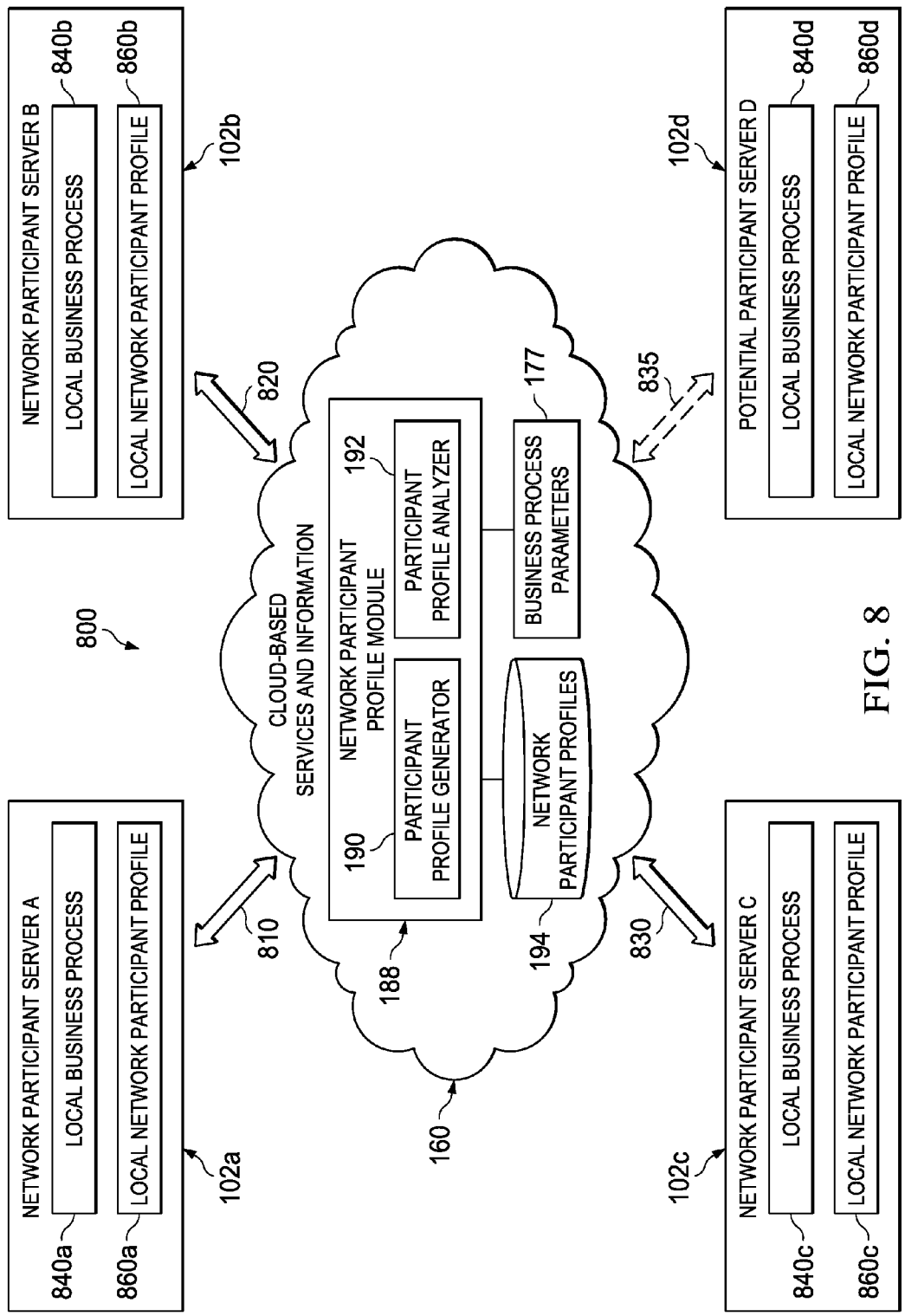
FIG. 8 is an illustration of an example system for analyzing a quality of services provided by a network participant associated with a networked business process.

FIG. 8 is an illustration of an example system 800 for analyzing the quality and types of services provided by network participants associated with a networked business process. System 800 includes three network participant servers (network participant server A 102a, network participant server B 102b, and network participant server C 103c), a potential network participant server D 102d, and a set of cloud-based services and information 160. The set of cloud-based services and information 160 includes the network participant profile module 188, where the network participant profile module 188 includes a participant profile generator 190 and a participant profile analyzer 192, both described above in FIG. 1. The set of cloud-based services and information 160 also includes a set of network participant profiles 194 defining characteristics and capabilities of a plurality of current, former, and potential network participants associated with the networked business process. Additionally, a set of networked business process parameters 177 is included in the set of cloud-based services and information 160, defining a set of parameters associated with the quality of services that are required and/or preferred for network participants within the networked business process.

Each current and potential network participant server 102 is illustrated as including a local business process 840 and a local network participant profile 860. In some instances, the network participant profile associated with a particular network participant server 102 may not be stored at the network participant server, but instead may be stored in the set of network participant profiles 194. In the example of FIG. 8, the initial networked business process includes the local business processes 840a, 840b, and 840c. Arrows 810, 820, and 830 indicate communications and information exchanges between the network participant servers 102 via the set of cloud-based services and information 160, such as status and context information as described in connection with FIGS. 3 and 6, respectively.

In one example, the administrator or designer of the networked business process may determine that additional functionality is to be added to the networked business process. In the current example, the new functionality is to be provided by a new network participant. In some instances, the participant profile analyzer 192 may review the networked business process parameters 177 to determine the required and preferred services, functionality, and overall quality of services associated with network participants in the networked business process. The participant profile analyzer 192 may then review the set of network participant profiles 194 to determine which of the plurality of potential network participants meets the functionality desired by the administrator or designer, as well as the quality of services specified by the networked business process parameters 177. In other words, the participant profile analyzer 192 can search for, identify, and rank potential network participants based on their functionality and quality of services.

Alternatively, a specific network participant and its local business process is proposed as a potential addition to the networked business process, with the participant profile analyzer 192 determining whether the potential network participant meets the requirements and recommendations determined by the parameters 177 associated with the networked business process. If the potential network participant does not meet one or more of the required parameters, or meets the required parameters but fails to provide a satisfactory number or percentage of the preferred parameters, the participant profile analyzer 192 may deny or reject an attempt to on-board or add the potential network participant to the networked business process.

If a current or potential network participant is not associated with a network participant profile, the participant profile generator 190 can be used to generate or create the corresponding profile. In some instances, the participant profile generator 190 may receive information from a representative associated with the current or potential network participant with regard to the capabilities of the network participant's network participant server 102 or its associated local business process 840. The participant profile generator 190 may also be capable of automatically deriving information about the capabilities of a network participant and its local business process based on metadata associated with the network participant or process, as well as based on information from one or more other network participants that have previously interacted with the network participant or process. Additionally, the participant profile generator 190 may import an already-generated profile from another system or environment, such as another set of cloud-based services and information not associated with the illustrated system 800.

In the present example, the potential network participant server D 102*d* includes a local business process 840*d* and a local network participant profile 860*d*. The potential network participant server D 102*d* and its local business process 840*d* are being added to the networked business process defined by the interactions between the other network participant servers 102*a*, 102*b*, and 102*c*. After analyzing the potential participant's network participant profile 860*d*, the network participant profile module 188 (via its participant profile analyzer 192) allows the on-boarding of the new network participant and process. In alternative implementations, the new network participant and process may be used to replace a current network participant that fails to perform at a certain level or threshold as determined by the system administrator, networked business process designer, or based on certain performance indicators or service level agreements. In those instances, the potential network participant server D 102*d* can replace one of the current network participants. In either event, once added, arrow 835 indicates the communications performed between the potential network participant server D 102*d* and the other network participant servers 102 via the set of cloud-based services and information 160.

Figure 9A:
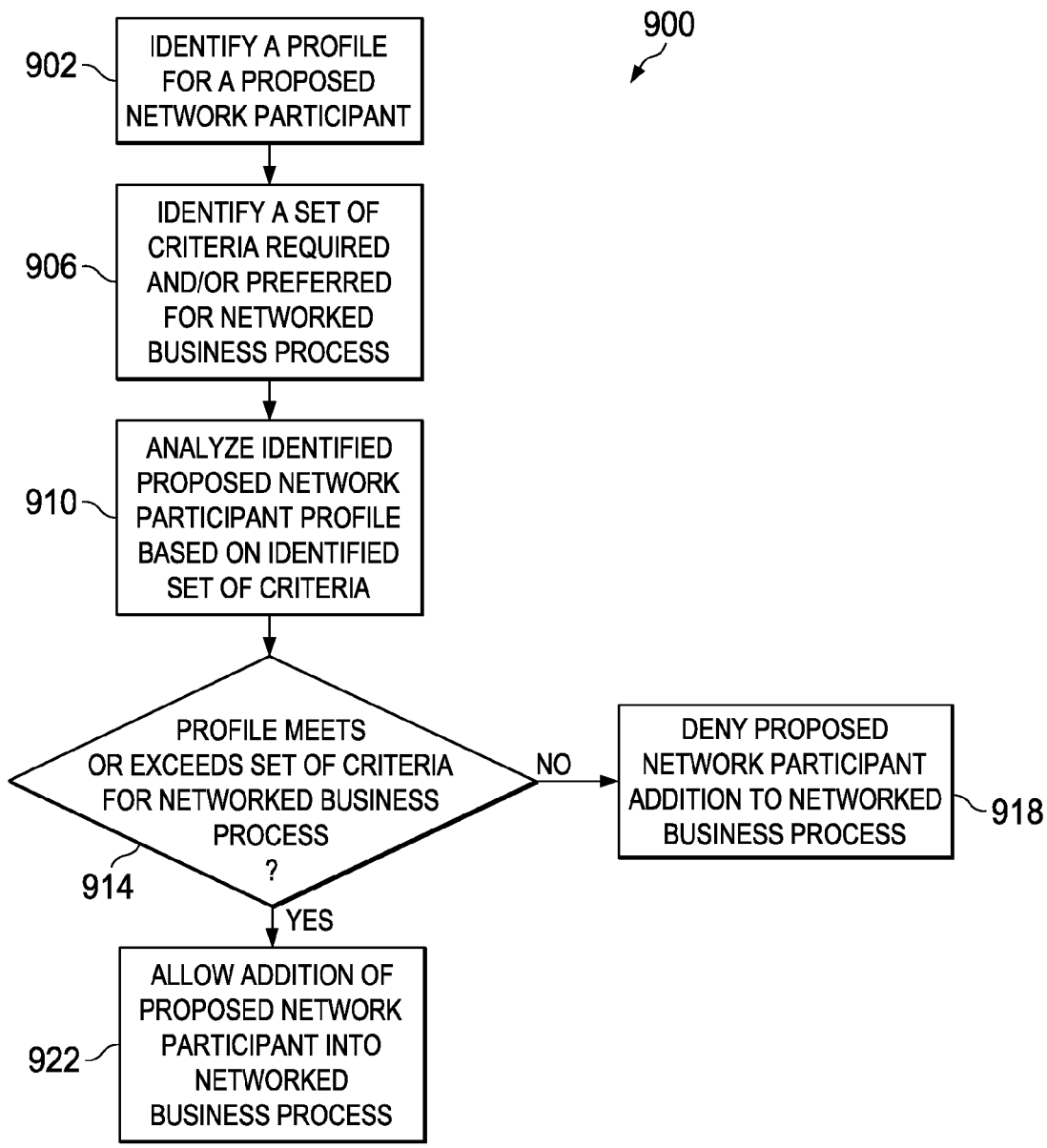
FIG. 9A is a flowchart of an example process for analyzing potential network participants based on criteria associated with the networked business process.

FIG. 9A is a flowchart of an example process or method 900 for analyzing potential new network participants based on criteria associated with the networked business process. For clarity of presentation, the description that follows generally describes method 900 in the context of environment 100 illustrated in FIG. 1 from the perspective of a network participant profile module. However, it will be understood that method 900 may be performed, for example, by any other suitable system, environment, or combination of systems and environments, as appropriate.

At 902, a profile for a proposed or potential new network participant to be added to the networked business process is identified. The proposed new network participant may be previously associated with a network participant profile defining a set of capabilities associated with the participant and any local business process associated therewith. In other instances, a profile associated with the proposed new network participant may be generated, either manually or automatically, as described above.

At 906, a set of criteria required and/or preferred for network participants and processes associated with the networked business process is identified. The set of criteria may include one or more required capabilities or quality of services to be provided by the network participants, as well as various preferred capabilities or quality of services. In some instances, a particular rating or threshold value associated with the set of criteria may be defined, where the rating or threshold value is based on a known algorithm used to calculate the relative level of the quality of services provided by a network participant within the networked business process that is necessary for transparency and communication purposes.

At 910, the identified network participant profile for the proposed or potential new network participant is analyzed based on the identified set of criteria. In some instances, analyzing the profile may include a determination as to whether the required parameters from the set of criteria are met by the profile. Additionally, analyzing the profile may include a calculation, based on the known algorithm, providing a rating or value defining the relative correspondence of the network participant profile to the identified set of criteria. The rating or value provides an objectively derived number defining the level of correspondence between the profile and the set of criteria.

At 914, a determination is made as to whether the identified network participant profile meets the set of criteria (or exceeds a threshold value defined thereby) associated with the networked business process. If one or more of the required criteria are not provided by the capabilities defined by the identified network participant profile, method 900 continues to 918. Additionally, if the required criteria are met, but the calculated rating or value of the network participant profile fails to meet or exceed the threshold value defined in the parameters associated with the networked business process, method 900 may also continue at 918. At 918, the addition of the proposed network participant to the networked business process is denied. If, however, the network participant profile meets the required capabilities and exceeds the minimum threshold, method 900 continues at 922, where the addition of the proposed network participant (and its associated business processes) to the networked business process is allowed by the network participant profile module.

Figure 9B:
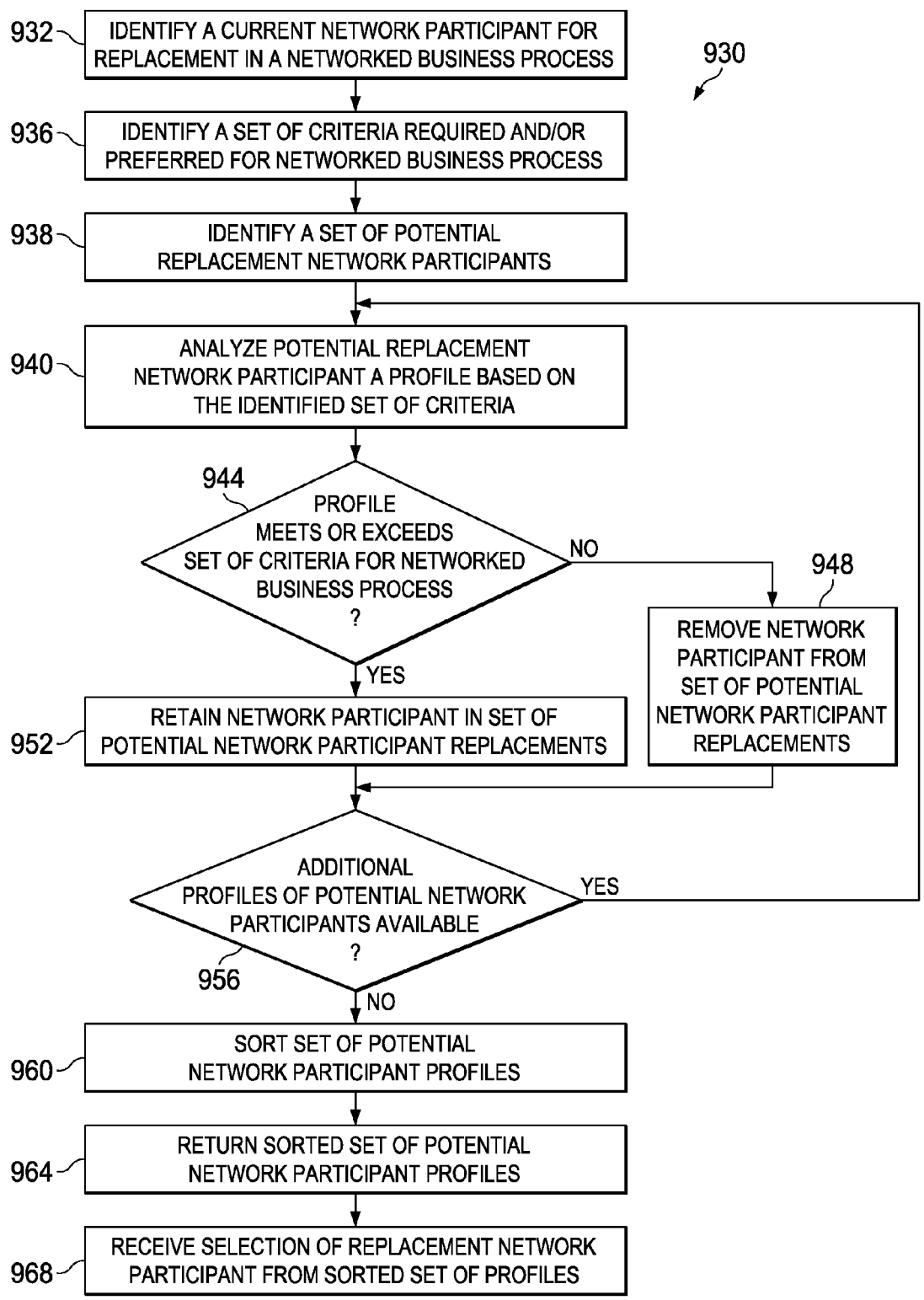
FIG. 9B is a flowchart of an example process for identifying at least one potential replacement network participant for a current network participant in a networked business process based on a set of criteria associated with the networked business process.

FIG. 9B is a flowchart of an example process or method 930 for identifying at least one potential replacement network participant for a current network participant in a networked business process based on a set of criteria associated with the networked business process. As described above, the set of criteria may include both required and preferred capabilities associated with participants and processes associated with the networked business process. For clarity of presentation, the description that follows generally describes method 930 in the context of environment 100 illustrated in FIG. 1 from the perspective of a network participant profile module. However, it will be understood that method 930 may be performed, for example, by any other suitable system, environment, or combination of systems and environments, as appropriate.

At 932, a current network participant in the networked business process is identified for replacement. The identified network participant may be replaced for any number of reasons, including failure to meet certain performance criteria (e.g., as determined by a centralized monitoring system as described above), a desire to reduce costs associated with the networked business process, or general design decisions and modifications. For purposes of description in method 930, the identified network participant is being removed for failure to perform to adequate standards, although the functionality performed by the identified network participant is to remain within the networked business process.

At 936, a set of criteria required and/or preferred for network participants and processes associated with the networked business process is identified. The operation of 936 may be performed as described in 906 of FIG. 9A, although other suitable operations may also be used. At 938, a set of potential network participants for replacing the functionality of the current network participant (from 932) is identified. In some instances, this action may include searching a set of network participant profiles to determine at least one potential network participant with functionality identical or similar to the functionality provided by the to-be-replaced network participant. Any suitable method of determining the set of at least one potential network participant with the appropriate functionality may be used. For example, a search engine or other network participant identification tool may be employed. In some instances, a network participant already included in the networked business process may be included in the set.

At 940, a network participant profile associated with a potential replacement network participant from the identified set is analyzed based on the set of criteria associated with the networked business process. The analysis operations of 940 may be similar to those performed at 910 of method 900, as well as other suitable analyses and comparisons of the capabilities of the potential replacement network participant.

At 944 a determination is made as to whether the potential replacement network participant's profile meets the set of criteria (or exceeds a threshold value defined by the criteria) associated with the networked business process. If one or more of the required criteria are not provided by the capabilities defined by the potential replacement network participant's profile, or if the required criteria are met, but the calculated rating or value of the potential replacement network participant's profile fails to meet or exceed the minimum threshold value defined by the criteria, method 930 continues at 948. At 948, the potential replacement network participant profile is removed from the set of potential network participant replacements. If, however, the potential replacement network participant's profile meets the required capabilities and exceeds the minimum threshold value of the criteria, method 930 continues at 952. At 952, the potential replacement network participant is retained within the set of potential network participant replacements, and method 930 continues at 956.

At 956, a determination is made as to whether any additional and yet-to-be analyzed potential replacement network participant profiles remain in the set of potential replacement network participants identified at 938. If additional profiles remain to be analyzed, method 930 returns to 940 where the next profile is analyzed. If, however, no additional profiles remain, method 930 moves to 960.

At 960, the set of potential network participant replacements as determined by 944 and 952 is sorted. In some instances, sorting the set of potential network participant replacements may include sorting according to a rating or value determined by the analysis at 940. The sort may alternatively or additionally be based on any particular profile information or capabilities identified within the profile. For example, the set of potential network participant replacements can be sorted by one or more of the following: whether the potential replacement network participant can publish information associated with start and/or end events, intermediate events and milestones, and error events, and whether the potential replacement network participant can provide support for business process termination, business process compensation, and/or ad hoc modification to a business process. Any other suitable sort methodology or criteria can also be used, including the cost to add a particular potential network participant to the networked business process. At 964, the sorted set of potential network participant profiles is returned, or in some instances, presented. The sorted set of potential replacements can be presented via a GUI associated with an administrator or business process designer, allowing the replacement network participant to be selected at 968. The selected replacement network participant and its associated business process can then be added to the networked business process, with the replaced network participant and its associated business process being removed from the networked business process.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for providing a virtual process context to a plurality of network participants associated with a networked business process, the method comprising:

associating a networked business process with the virtual process context, the networked business process defined as comprising a set of interrelated business processes, the set of interrelated business processes performed by at least two different network participants, the virtual process context comprising a delocalized store of context information associated with the networked business process and the set of interrelated business processes, the virtual process context configured to be modified and accessed by the set of interrelated business processes during execution of the networked business process;

receiving a first data object from a first business process instance associated with the networked business process, the first business process instance included in the set of interrelated business processes and associated with a first network participant, the first data object received during execution of the first business process instance;

storing the received first data object in the virtual process context associated with the networked business process;

determining at least a second business process instance associated with the networked business process and the first data object, the second business process instance included in the set of interrelated business processes and associated with a second network participant different than the first network participant; and notifying at least the second business process instance of the stored first data object in the virtual process context.

2. The method of claim 1, wherein notifying at least the second network participant of the stored first data object comprises transmitting a copy of the first data object to at least the second network participant associated with the first data object.

3. The method of claim 1, wherein notifying at least the second network participant of the stored first data object comprises sending a notification of a modification to the virtual process context to at least the second network participant.

4. The method of claim 1, where the first data object comprises structured or unstructured data.

5. The method of claim 1, further comprising:
receiving a request from the second network participant for access to the first data object;
providing access to the first data object to the second network participant in response to the request;
receiving an updated first data object from the second network participant;
storing the updated first data object in the virtual process context; and
notifying at least a third network participant of the updated first data object.

6. The method of claim 5, further comprising:
receiving a second data object from the second network participant; and
storing the second data object in the virtual process context.

7. The method of claim 1, further comprising:
receiving a second data object from the second network participant;
storing the received second data object in the virtual context; and
notifying at least a third network participant of the stored first data object.

8. The method of claim 7, further comprising:
receiving a request from the first network participant for access to the second data object;
providing access to the second data object to the first network participant in response to the request;
receiving an updated second data object from the first network participant;
storing the updated second data object in the virtual process context; and
notifying at least one network participant of the updated second data object.

9. The method of claim 7 wherein the third network participant comprises the first network participant.

10. The computer-implemented method of claim 1 wherein the virtual process context is stored in a cloud-based system.

11. The computer-implemented method of claim 1 wherein notifying at least a second network participant of the stored first data object comprises transmitting a notification to the second network participant including an identification of the first data object, the identification allowing the second network participant to access the virtual process context to retrieve a copy of the first data object.

12. An article comprising a non-transitory, machine-readable storage device storing instructions operable to cause at least one processor to perform operations comprising:
associating a networked business process with a virtual process context, the networked business process is defined as comprising a set of interrelated business processes, the set of interrelated business processes performed by at least two different network participants, the virtual process context comprising a delocalized store of context information associated with the networked business process and the set of interrelated business processes and configured to be modified and accessed by the set of interrelated business process during execution of the networked business process;
receiving a first data object from a first business process instance associated with the networked business process, the first business process instance included in the set of interrelated business processes and associated with a first network participant, the first data object received during execution of the first business process instance;
storing the received first data object in the virtual process context associated with the networked business process;
determining at least a second business process instance associated with the networked business process and the first data object, the second business process instance included in the set of interrelated business processes and associated with a second network participant different than the first network participant; and
notifying at least the second business process instance of the stored first data object in the virtual process context.

13. The article of claim 12, wherein notifying at least the second network participant of the stored first data object comprises transmitting a copy of the first data object to at least the second network participant associated with the first data object.

14. The article of claim 12, wherein notifying at least a second network participant of the stored first data object comprises sending a notification of a modification to the virtual process context to at least the second network participant.

15. The article of claim 12, wherein the first data object comprises structured or unstructured data.

16. The article of claim 12, the instructions operable to cause at least one process to perform operations further comprising:
receiving a request from a second network participant for access to the first data object;
providing access to the first data object to the second network participant in response to the request;
receiving an updated first data object from the second network participant;
storing the updated first data object in the virtual process context; and
notifying at least a third network participant of the updated first data object.

17. The article of claim 16, the instructions operable to cause at least one process to perform operations further comprising:
receiving a second data object from the second network participant; and
storing the second data object in the virtual process context.

18. The article of claim 12, the instructions operable to cause at least one process to perform operations further comprising:
- receiving a second data object from the second network participant;
- storing the received second data object in the virtual process context; and
- notifying at least a third network participant of the stored first data object.

19. The article of claim 18, the instructions operable to cause at least one process to perform operations further comprising:
- receiving a request from the first network participant for access to the second data object;
- providing access to the second data object to the first network participant in response to the request;
- receiving an updated second data object from the first network participant;
- storing the updated second data object in the virtual process context; and
- notifying at least one network participant of the updated second data object.

20. The article of claim 18 wherein the third network participant comprises the first network participant.

* * * * *